(12) United States Patent
Kim et al.

(10) Patent No.: US 11,264,851 B2
(45) Date of Patent: Mar. 1, 2022

(54) MOTOR HAVING ALTERNATELY ARRANGED ROTOR CORE SEGMENTS AND PERMANENT MAGNETS

(71) Applicant: LG Electronics Inc., Seoul (KR)

(72) Inventors: Jaeho Kim, Seoul (KR); Minsoo La, Seoul (KR); Hyuk Nam, Seoul (KR); Kyungmo Yu, Seoul (KR); Sangyoung Cho, Seoul (KR); Kyungho Ha, Seoul (KR); Pangeun Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 138 days.

(21) Appl. No.: 16/696,505

(22) Filed: Nov. 26, 2019

(65) Prior Publication Data

US 2020/0169134 A1 May 28, 2020

(30) Foreign Application Priority Data

Nov. 26, 2018 (KR) .......................... 10-2018-0147665
Nov. 26, 2018 (KR) .......................... 10-2018-0147666
(Continued)

(51) Int. Cl.
*H02K 1/27* (2006.01)
*H02K 1/30* (2006.01)
(Continued)

(52) U.S. Cl.
CPC ............... *H02K 1/30* (2013.01); *H02K 1/276* (2013.01); *H02K 1/2766* (2013.01);
(Continued)

(58) Field of Classification Search
CPC .... H02K 1/276; H02K 1/2766; H02K 1/2786; H02K 1/28; H02K 1/30; H02K 15/03; H02K 15/12
(Continued)

(56) References Cited

U.S. PATENT DOCUMENTS 4,012,651 A 3/1977 Burson
4,339,874 A 7/1982 Mc'Carty et al.
(Continued)

FOREIGN PATENT DOCUMENTS

CN 1845427 10/2006
CN 101675188 3/2010
(Continued)

OTHER PUBLICATIONS

Extended European Search Report in European Application No. 19210105.3, dated Apr. 7, 2020, 16 pages.
(Continued)

*Primary Examiner* — Quyen P Leung
*Assistant Examiner* — Eric Johnson
(74) *Attorney, Agent, or Firm* — Fish & Richardson P.C.

(57) ABSTRACT

A motor includes a stator and a rotor. The rotor includes: a plurality of rotor core segments arranged along a circumferential direction of the rotor on the inner side or the outer side of the stator and spaced apart from one another to define a plurality of permanent magnet arrangement slots between the plurality of rotor core segments; a plurality of permanent magnets inserted into the plurality of permanent magnet arrangement slots, respectively; a first frame that couples the plurality of rotor core segments to the plurality of permanent magnets, the first frame being made of a first material; and a second frame that surrounds the plurality of rotor core segments, the plurality of permanent magnets, and the first frame and that couples the plurality of rotor core segments, the plurality of permanent magnets, and the first frame to one another. The second frame is made of a second material different from the first material.

14 Claims, 15 Drawing Sheets

(30) Foreign Application Priority Data

Nov. 26, 2018 (KR) ........................ 10-2018-0147667
Nov. 26, 2018 (KR) ........................ 10-2018-0147669

(51) Int. Cl.
| | | |
|---|---|---|
| *H02K 1/2786* | (2022.01) | |
| *H02K 1/276* | (2022.01) | |
| *H02K 21/22* | (2006.01) | |
| *H02K 21/16* | (2006.01) | |

(52) U.S. Cl.
CPC .......... *H02K 1/2786* (2013.01); *H02K 21/16* (2013.01); *H02K 21/22* (2013.01)

(58) Field of Classification Search
USPC ..................................................... 310/43, 45
See application file for complete search history.

(56) References Cited

U.S. PATENT DOCUMENTS

| | | | |
|---|---|---|---|
| 5,786,650 | A | 7/1998 | Uchida et al. |
| 6,384,504 | B1 | 5/2002 | Ehrhart et al. |
| 9,590,459 | B2 | 3/2017 | Hoemann |
| 2003/0193254 | A1 | 10/2003 | Morimatsu |
| 2006/0091754 | A1 | 5/2006 | Kim et al. |
| 2010/0050702 | A1* | 3/2010 | Kim ............... H02K 21/16 68/23 R |
| 2011/0175479 | A1 | 7/2011 | Marchitto |
| 2011/0187210 | A1 | 8/2011 | Marchitto |
| 2012/0043844 | A1* | 2/2012 | Bailey ............... H02K 1/30 310/156.12 |
| 2012/0286520 | A1 | 11/2012 | Booth |
| 2013/0061641 | A1 | 3/2013 | Yoon et al. |
| 2013/0119808 | A1 | 5/2013 | Hirokawa et al. |
| 2014/0070653 | A1 | 3/2014 | Lee et al. |
| 2014/0097718 | A1* | 4/2014 | Yukinori ............ H02K 21/16 310/156.08 |
| 2014/0102151 | A1 | 4/2014 | Yoon et al. |
| 2014/0152135 | A1 | 6/2014 | Jang et al. |
| 2014/0375162 | A1 | 12/2014 | Kim et al. |
| 2015/0076933 | A1 | 3/2015 | Hoemann et al. |
| 2015/0380998 | A1 | 12/2015 | Hoemann |
| 2016/0156233 | A1* | 6/2016 | Yoon ............... H02K 1/2786 310/43 |
| 2017/0070107 | A1 | 3/2017 | Lee et al. |
| 2017/0170694 | A1* | 6/2017 | Bhargava ........... D06F 37/304 |
| 2018/0069443 | A1 | 3/2018 | Han et al. |
| 2019/0207446 | A1 | 7/2019 | Swales et al. |

FOREIGN PATENT DOCUMENTS

| | | |
|---|---|---|
| CN | 102035281 | 4/2011 |
| CN | 102163900 | 8/2011 |
| CN | 102738924 | 10/2012 |
| CN | 103053096 | 4/2013 |
| CN | 104285363 | 1/2015 |
| CN | 104393730 | 3/2015 |
| CN | 105474514 | 4/2016 |
| CN | 107733111 | 2/2018 |
| CN | 107735924 | 2/2018 |
| DE | 909472 | 4/1954 |
| EP | 0669699 | 8/1995 |
| EP | 1237252 | 9/2002 |
| EP | 2824300 | 1/2015 |
| EP | 2942858 | 11/2015 |
| EP | 3349332 | 7/2018 |
| JP | H07264793 | 10/1995 |
| JP | 2001095185 | 4/2001 |
| JP | 2003510998 | 3/2003 |
| JP | 2005261177 | 9/2005 |
| JP | 2012217269 | 11/2012 |
| JP | 2015080336 | 4/2015 |
| KR | 20120110275 | 10/2012 |
| KR | 20130090165 | 8/2013 |
| KR | 20160112412 | 9/2016 |
| KR | 20170030022 | 3/2017 |
| KR | 20180020030 | 2/2018 |
| WO | WO2015009031 | 1/2015 |

OTHER PUBLICATIONS

Extended European Search Report in European Application No. 19210101.2, dated Apr. 2, 2020, 13 pages.
Fofanov et al., "Magnetic properties stainless steel," Stahl, dated Jan. 1, 2013, 24 pages, XP055561965 (with English translation).
EP Office Action in European Appln. No. 19210107.9, dated Feb. 19, 2021, 7 pages.
Extended European Search Report in European Application No. 19210107.9, dated Apr. 15, 2020, 8 pages.
Extended European Search Report in European Application No. 19210106.1 dated Apr. 14, 2020, 9 pages.
Non-Final Office Action in U.S. Appl. No. 16/696,393, dated Jul. 9, 2021, 47 pages.
Office Action in Chinese Appln. No. 201911175236.8, dated Sep. 23, 2021, 23 pages (with English translation).
Office Action in Chinese Appln. No. 201911174705.4, dated Sep. 30, 2021, 16 pages (with English translation).
Office Action in Chinese Appln. No. 201911175262.0, dated Sep. 23, 2021, 15 pages (with English translation).
Office Action in Chinese Appln. No. 201911176293.8, dated Sep. 23, 2021, 17 pages (with English translation).
Office Action in U.S. Appl. No. 16/696,117, dated Nov. 26, 2021, 27 pages.
Office Action in U.S. Appl. No. 16/696,311, dated Nov. 26, 2021, 30 pages.

* cited by examiner

MOTOR HAVING ALTERNATELY ARRANGED ROTOR CORE SEGMENTS AND PERMANENT MAGNETS

CROSS-REFERENCE TO RELATED APPLICATIONS

Pursuant to 35 U.S.C. § 119(a), this application claims the benefit of the earlier filing date and the right of priority to Korean Applications No. 10-2018-0147665, filed on Nov. 26, 2018, No. 10-2018-0147666, filed on Nov. 26, 2018, No. 10-2018-0147667, filed on Nov. 26, 2018, and No. 10-2018-0147669, filed on Nov. 26, 2018, the contents of which are incorporated by reference herein in their entirety.

TECHNICAL FIELD

The present disclosure relates to a motor.

BACKGROUND

A motor is a device that can provide a rotational force generated by electromagnetic interaction between a stator and a rotor to a rotation shaft. A coil may be wound on the stator to generate a rotational force, and the rotor may rotate when a current is applied to the coil. The motor may be used in various fields such as a washing machine, a refrigerator, a compressor, and a cleaner. For example, the motor may be connected to a drum of the washing machine by a rotation shaft to implement the rotation of the drum.

In some examples, permanent magnet type motors may be classified into surface mounted magnet types and interior permanent magnet types according to the attachment type of a permanent magnet. The surface mounted magnet type denotes a form in which a permanent magnet is attached to a surface of a rotor core. The interior permanent magnet type denotes a form in which a permanent magnet embedded in the rotor core. The interior permanent magnet types may include a spoke type in which the rotor core and the permanent magnet stand along a height direction parallel to an axial direction of the rotation shaft.

A spoke type motor may have an advantage in improving the efficiency and performance of the rotor through a magnetic flux concentration effect using the rotor core. In some cases, when a rotational speed of the rotation shaft generated by the spoke type motor is excessively fast, there is a concern that the structural strength of the rotor is lowered. For example, during a spin-drying operation, the rotation shaft of the motor installed in a washing machine may rotate at a higher speed than the other operations, and the rotation speed may exceed 1,200 rpm.

In some cases, when the rotation shaft of the motor excessively rotates, a strong centrifugal force may act on the rotor of the motor. Furthermore, this strong centrifugal force may cause breakage in which the permanent magnet or rotor core in the rotor is separated in a radial direction of the rotor. In some examples, to mitigate such breakage, a motor may include a first fastening member disposed above and below a permanent magnet, and a second fastening member disposed to pass through the rotor core.

In some examples, when the rotation shaft of the motor rotates at a slow speed, the structure may prevent the permanent magnet and the rotor core from being disengaged using the two fastening members and the rotor housing. In some cases, the first fastening member, the second fastening member, and the rotor housing may be formed with individual parts, and thus when the rotation shaft of the motor rotates at a very high speed, the possibility of breakage occurrence may be very high due to an insufficient physical coupling force between each part.

In some cases, the first fastening members are disposed above and below the permanent magnet and the rotor core, respectively, which may increase the motor size.

In some cases, the rotor housing, the rotor core, the permanent magnet, the first fastening member, and the second fastening member may be sequentially assembled in a predetermined order. In this respect, the productivity may be low, particularly as the number of the fastening members increases, which is disadvantageous to mass production.

In some case, it may be difficult to improve the structural strength without a size increase or performance deterioration of the rotor rotating at a high speed by using structures such as the fastening members or the like.

SUMMARY

When a structural strength of a rotor is to be reinforced by introducing structures such as fastening members or the like, the process of forming holes in a rotor core segment to insert fastening members and fastening the fastening members may be carried out. When the size of a fastening member is increased in order to increase the rigidity of the fastening member, the size of a rotor core segment may be inevitably reduced, thereby resulting in a size increase of the motor and performance deterioration of the motor. The present disclosure describes one or more techniques to improve the performance of a motor and decrease or maintain a size of the motor. Accordingly, the present disclosure describes a structure capable of improving the structural strength of a motor without causing performance degradation or a size increase of the motor.

In some cases, when a connection strength between the fastening members is insufficient, a strong centrifugal force acting on a rotor during a high-speed operation of a motor may cause a breakage of the rotor. In particular, considering that the need for a motor operating at a high speed in various devices such as a washing machine, a cleaner, or the like is continuously increasing, it is not sufficient to secure the structural strength only during a low-speed operation. Accordingly, the present disclosure provides a motor having a structure capable of preventing a permanent magnet and a rotor core segment from being damaged in a radial direction due to a strong centrifugal force acting on a rotor even during a high-speed operation of the motor. In addition, the present disclosure also presents a structure capable of prevent a breakage of a motor caused due to an insufficient physical coupling force between the individual parts.

The present disclosure also describes a structure capable of improving the productivity of a motor through integration of parts to improve the structural strength of a rotor through the introduction of fastening members.

The present disclosure also presents a configuration in which a rotor core segment and a permanent magnet are stably mounted in place on a rotor frame during the process of producing a motor to securely maintain a coupling state.

The present disclosure further describes a motor having a configuration addressing shrinkage that may occur during the injection molding process.

According to one aspect of the subject matter described in this application, a motor includes a stator and a rotor rotatably disposed at an inner side of the stator or an outer side of the stator. The rotor includes: a plurality of rotor core segments arranged along a circumferential direction of the rotor on the inner side or the outer side of the stator and spaced apart from one another to define a plurality of permanent magnet arrangement slots between the plurality of rotor core segments; a plurality of permanent magnets inserted into the plurality of permanent magnet arrangement slots, respectively, where the plurality of rotor core segments and the plurality of permanent magnets are alternately arranged along the circumferential direction of the rotor; a first frame that couples the plurality of rotor core segments to the plurality of permanent magnets, the first frame being made of a first material; and a second frame that surrounds the plurality of rotor core segments, the plurality of permanent magnets, and the first frame and that couples the plurality of rotor core segments, the plurality of permanent magnets, and the first frame to one another. The second frame is made of a second material different from the first material.

Implementations according to this aspect may include one or more of the following features. For example, a tensile strength of the first material may be greater than a tensile strength of the second material. In some implementations, a contraction ratio of the second material in molding the second frame is less than a contraction ratio of the first material in molding the first frame. In some implementations, a thermal deflection temperature of the first material may be less than a thermal deflection temperature of the second material.

In some implementations, the motor may further include a rotation shaft that is connected to the rotor and that passes through the stator. Each of the plurality of rotor core segments may have a first end and a second end positioned opposite to each other in an axial direction of the rotation shaft, and each of the plurality of permanent magnets may have a first end and a second end positioned opposite to each other in the axial direction of the rotation shaft. The first frame may include: a first end cover that has an annular shape and that covers the first ends of the plurality of rotor core segments and the first ends of the plurality of permanent magnets; a second end cover that faces the first end cover in the axial direction, that may have an annular shape, and that covers the second ends of the plurality of rotor core segments and the second ends of the plurality of permanent magnets; a plurality of inner pillars that extend in the axial direction and that connect an inner end of the first end cover and an inner end of the second end cover to each other, the plurality of inner pillars being spaced apart from one another along a circumferential direction of the first frame; and a plurality of outer pillars that extend in the axial direction and that connect an outer end of the first end cover and an outer end of the second end cover to each other, the plurality of outer pillars being spaced apart from one another along the circumferential direction of the first frame.

In some implementations, the plurality of inner pillars and the plurality of outer pillars may be alternately arranged along the circumferential direction of the first frame. In some implementations, two adjacent inner pillars of the plurality of inner pillars may define an opening between the inner end of the first end cover and the inner end of the second end cover, and an inner end of one of the plurality of permanent magnets may be exposed in a radial direction of the rotor through the opening.

In some implementations, the plurality of rotor core segments and the plurality of inner pillars may be alternately arranged along the circumferential direction of the first frame, and the plurality of rotor core segments and the plurality of inner pillars may cover the plurality of permanent magnets in a radial direction of the first frame. In some implementations, each of the plurality of rotor core segments may include: a body that faces a working surface of one of the plurality of permanent magnets in the circumferential direction of the rotor; and core protrusions that protrude radially outward from an outer end of the body and that are spaced apart from each other in the circumferential direction of the rotor to thereby define a rotor core slot between the core protrusions. Each of the plurality of outer pillars may be inserted into the rotor core slot.

In some implementations, each of the plurality of rotor core segments may include: a body that faces a working surface of one of the plurality of permanent magnets in the circumferential direction of the rotor, where the body defines a rotor core hole that extends along the axial direction of the rotation shaft. The first frame may further include a plurality of intermediate pillars that are spaced apart from one another along the circumferential direction of the first frame, where each of the plurality of intermediate pillars is disposed between the plurality of inner pillars and the plurality of outer pillars in a radial direction of the first frame, and each of the plurality of intermediate pillars extends in the axial direction and connects the first end cover and the second end cover to each other through the rotor core hole.

In some implementations, the first frame may define a plurality of first frame holes that face each other in the axial direction of the rotation shaft and that are disposed at each of the first end cover and the second end cover, and the plurality of first frame holes may be spaced apart from one another and arranged along the circumferential direction of the first frame.

In some examples, each of the plurality of rotor core segments may include a body that faces a working surface of one of the plurality of permanent magnets in the circumferential direction of the rotor, where the body defines a rotor core hole that extends along the axial direction of the rotation shaft, and the rotor core hole faces one of the plurality of first frame holes in the axial direction of the rotation shaft.

In some implementations, the second frame may include: a first end base that may have an annular shape along the circumferential direction of the rotor and that covers the first end cover a second end base that may have an annular shape along the circumferential direction of the rotor and that covers the second end cover, the second end base facing the first end base in the axial direction of the rotation shaft; and a plurality of intermediate pillars that extend along the axial direction of the rotation shaft and that are spaced apart from each other along a circumferential direction of the second frame, where each of the plurality of intermediate pillars connects the first end base and the second end base to each other through the rotor core hole and one of the plurality of first frame holes.

In some implementations, each of the plurality of first frame holes may be defined between two rotor core holes of the plurality of rotor core segments in the circumferential direction of the first frame. The first frame may include a plurality of first intermediate pillars that are each disposed between the plurality of inner pillars and the plurality of outer pillars in a radial direction of the first frame, where each of the plurality of first intermediate pillar extends in the axial direction of the rotation shaft and connects the first end cover and the second end cover to each other through the rotor core hole.

In some implementations, the second frame may include: a first end base that has an annular shape along the circumferential direction of the rotor and that covers the first end cover, a second end base that has an annular shape along the circumferential direction of the rotor and that covers the second end cover, the second end base facing the second end cover in the axial direction; and a plurality of second intermediate pillars, each of the plurality of second intermediate pillars extending along the axial direction of the rotation shaft and connecting the first end base and the second end base to each other through of the rotor core hole and one of the first frame holes. The plurality of first intermediate pillars and the plurality of second intermediate pillars may be alternately arranged along the circumferential direction of the rotor and are spaced apart from one another along the circumferential direction of the rotor.

In some implementations, the first frame may define a permanent magnet fixing jig hole at a boundary between the first end cover and each of the plurality of inner pillars. In some examples, the second frame may include: a first end base that has an annular shape along the circumferential direction of the rotor and that covers the first end cover; a second end base that has an annular shape along a circumferential direction of the rotor and that covers the second end cover, the second end base facing the second end cover in the axial direction of the rotation shaft; and a plurality of protrusions that protrude in the axial direction of the rotation shaft from an inner end of the first end base and that are spaced apart from one another along the inner end of the first end base. Each of the plurality of protrusions is inserted into the permanent magnet fixing jig hole.

In some implementations, the second frame may include: a first end base that has an annular shape along the circumferential direction of the rotor and that covers the first end cover, a second end base that has an annular shape along the circumferential direction of the rotor and that covers the second end cover, the second end base facing the second end cover in the axial direction of the rotation shaft; and an outer wall that surrounds an outer end of the first frame in a radial direction of the rotor, that extends along the axial direction of the rotation shaft, and that connects the first end base and the second end base to each other.

In some examples, the second frame further may include an inner wall that surrounds an inner end of the first frame in the radial direction of the rotor, that extends along the axial direction of the rotation shaft, and that connects the first end base and the second end base to each other. In some examples, the inner wall may define a plurality of openings that are arranged along the circumferential direction of the rotor, where each of the plurality of openings exposes an inner end of one of the plurality of rotor core segments in the radial direction of the rotor.

BRIEF DESCRIPTION OF THE DRAWING

The accompanying drawings, which are included to provide a further understanding of the disclosure and are incorporated in and constitute a part of this specification, illustrate one or more implementations of the disclosure and together with the description serve to explain the principles of the disclosure. In the drawings.

DETAILED DESCRIPTION

Figure 1:
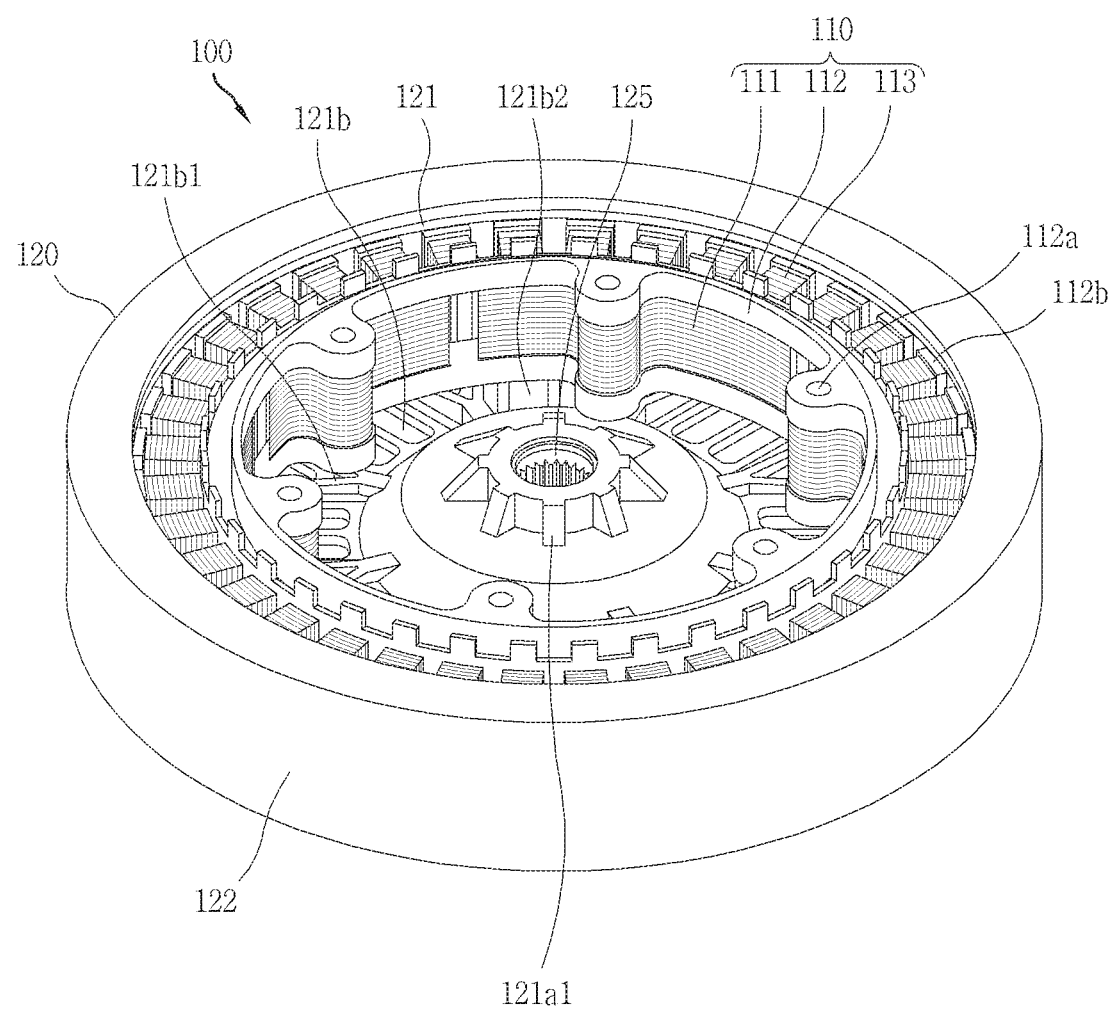
FIG. 1 is a perspective view showing an example motor.

Hereinafter, a motor will be described in more detail with reference to the accompanying drawings.

The same or similar reference numerals may be designated to the same or similar configurations, and the description thereof will be substituted by the earlier description.

FIG. 1 is a perspective view showing an example of a motor 100. The motor 100 may include a stator 110 and a rotor 120. The stator 110 may include a stator core 111, an insulator 112, and a coil 113.

In some implementations, the stator core 111 may be formed by stacking a plurality of electrical steel sheets (magnetic bodies) along an axial direction of a rotation shaft coupled to the motor 100. The stator core 111 may surround the rotation shaft at a position spaced apart from the rotation shaft.

In some implementations, the insulator 112 may be coupled to the stator core 111 at one side and the other side (e.g., upper and lower sides) along a direction parallel to an axial direction of the rotation shaft (in a vertical direction in FIG. 1). The insulator 112 may be made of an electrically insulating material. The insulator 112 may have a stator fixing portion 112a and a teeth insulation portion 112b.

The stator fixing portion 112a may protrude from a circumference of the insulator 112 toward the rotation shaft. The plurality of stator fixing portions 112a are formed. The plurality of stator fixing portions 112a may be disposed at positions spaced apart from each other along the circumference of the insulator 112. The stator fixing portion 112a may define a fastening member fixing hole to be open toward a direction parallel to an axial direction of the rotation shaft. The position of the stator 110 is fixed as the fastening member is coupled to the fastening member fixing hole.

The teeth insulation portion 112b may protrude radially from the circumference of the insulator 112. The teeth insulation portion 112b insulates the coil 113 from teeth connected to a yoke by surrounding the teeth surrounded by the coil 113.

The coil 113 is wound on each teeth insulation portion 112b. Concentrated winding is shown in FIG. 1. A current is applied to the coil 113. The motor 100 is operated by the current applied to the coil 113.

The rotor 120 is rotatably disposed on an inner or outer side of the stator 110. The inner and outer sides are determined whether it faces toward the rotation shaft disposed at the center in a radial direction of the rotor 120 or faces toward an opposite direction thereof. The direction toward the rotation shaft is an inner side, and the direction away from the rotation shaft is an outer side. In FIG. 1, the rotor 120 shows an outer rotor 120 disposed on an outer side of the stator 110.

The rotor 120 includes a first frame 121 and a second frame 122.

The first frame 121 is formed to surround the plurality of rotor cores (or rotor core segments, or rotor core blocks) 123 and the plurality of permanent magnets 124, which will be described later.

The second frame 122 is formed to surround the plurality of rotor core segments 123, the plurality of permanent magnets 124, and the first frame 121. The second frame 122 is connected to the rotation shaft.

The more detailed structure of the first frame 121 and the second frame 122, and components with reference numerals that are not described in FIG. 1 will be described with reference to FIGS. 2 through 5 in which the stator 110 is removed and only the rotor 120 is shown.

Figure 2:
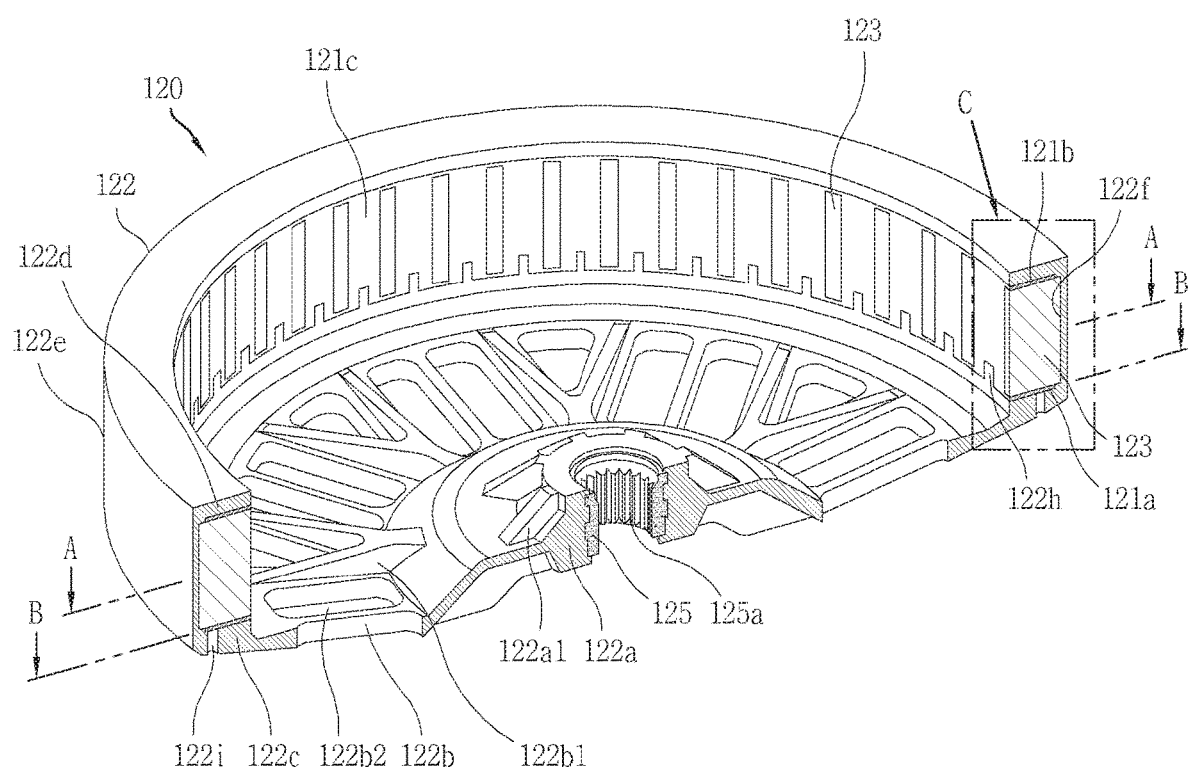
FIG. 2 is a perspective view showing an example rotor illustrated in FIG. 1 in a state cut along an axial direction.

FIG. 2 is a perspective view showing a state in which the rotor 120 illustrated in FIG. 1 is cut along an axial direction.

Figure 3:
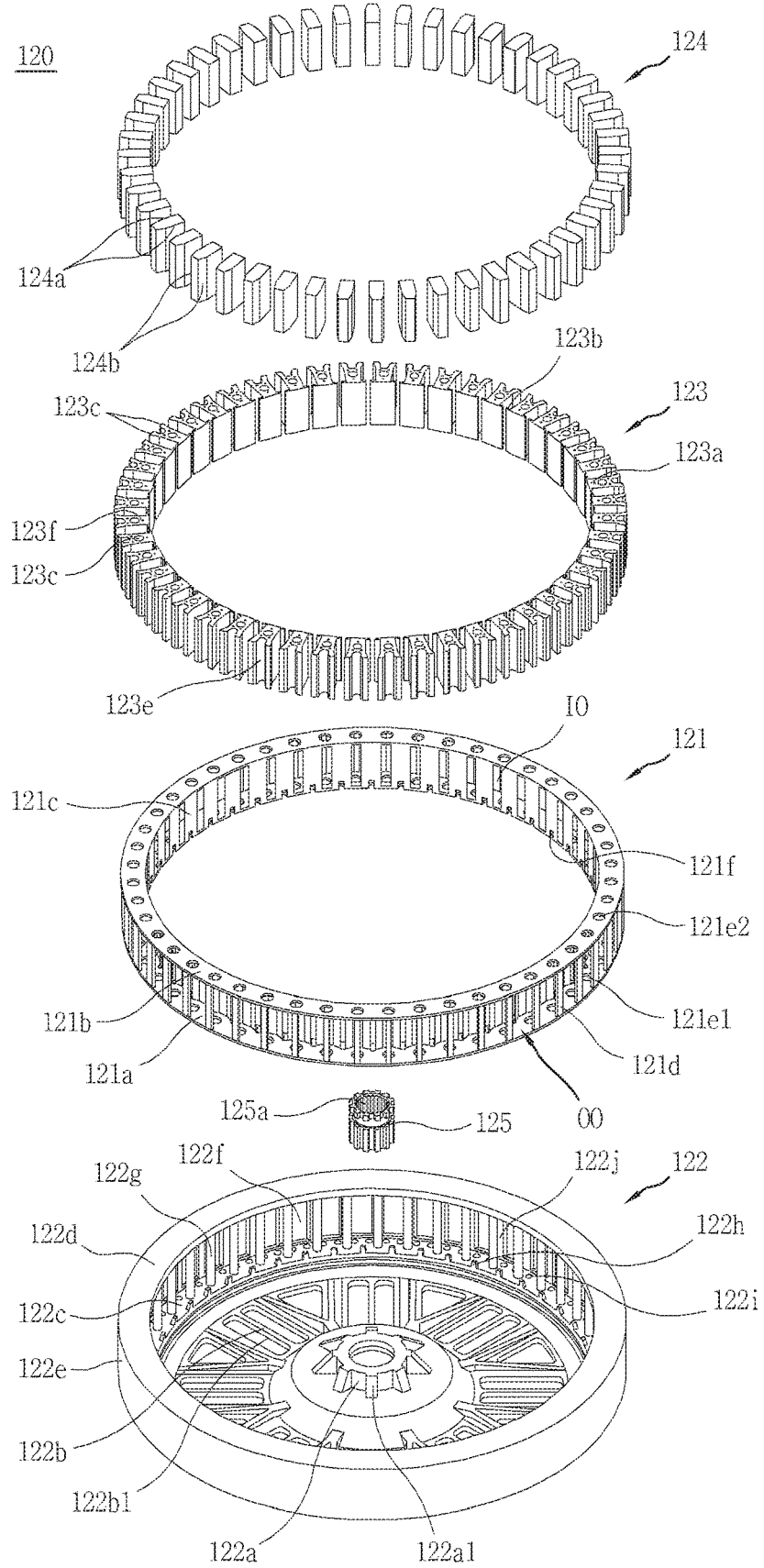
FIG. 3 is an exploded perspective view showing the rotor illustrated in FIG. 2.

FIG. 3 is an exploded perspective view of the rotor 120.

Figure 4:
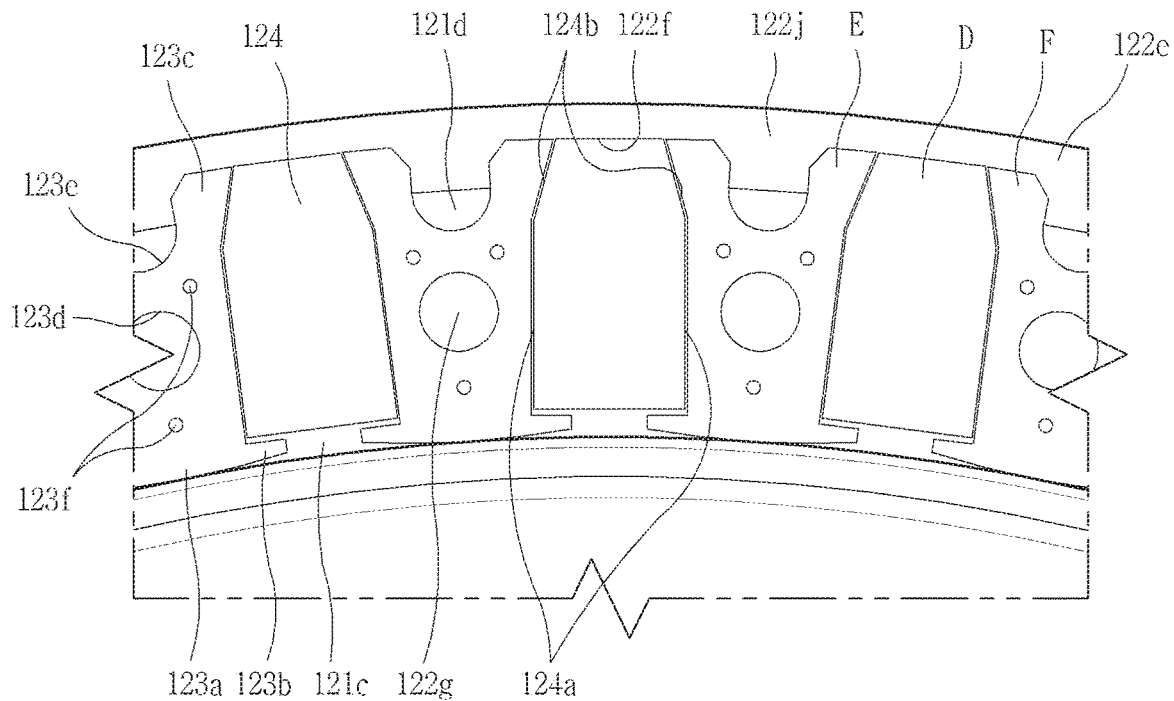
FIG. 4 is a partial cross-sectional view of the rotor taken along line A-A in FIG. 2 and viewed from above the rotor.

FIG. 4 is a partial cross-sectional view in which the rotor 120 taken along line A-A in FIG. 2 is seen from the top.

Figure 5:
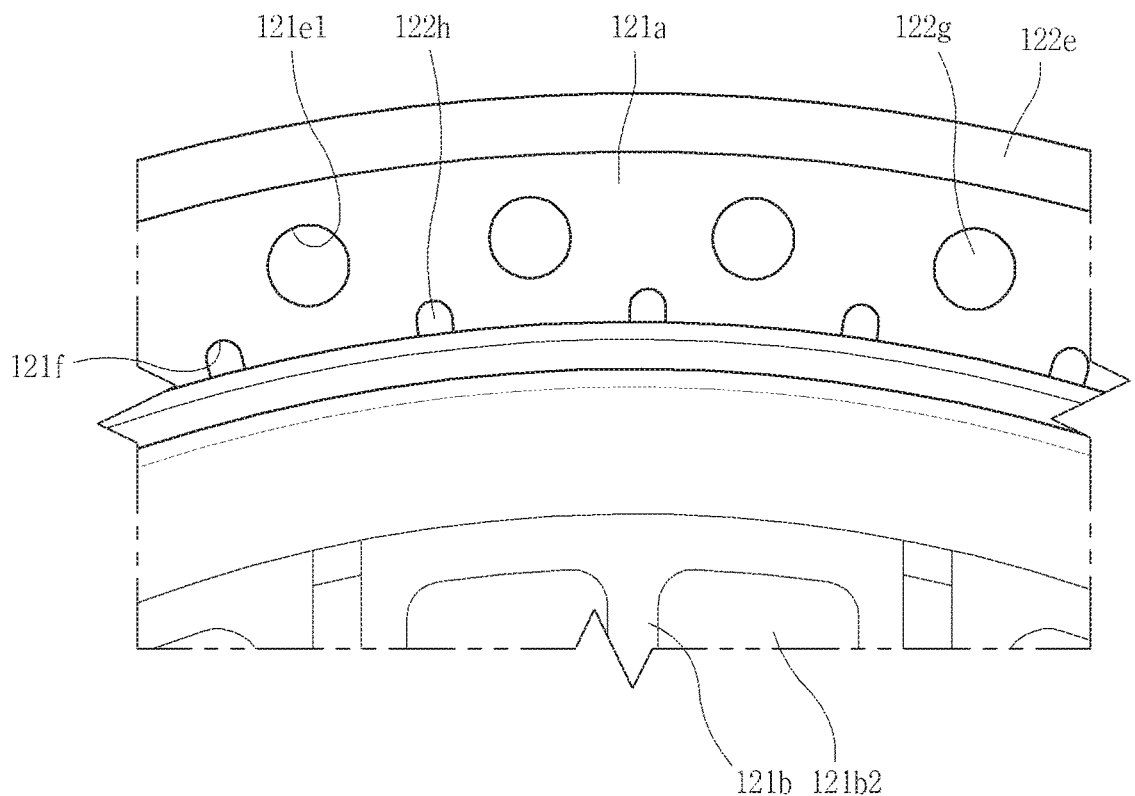
FIG. 5 is a partial cross-sectional view of the rotor taken along line B-B in FIG. 2 and viewed from above the rotor.

FIG. 5 is a partial cross-sectional view in which the rotor 120 taken along line B-B in FIG. 2 is seen from the top.

The rotor 120 includes a plurality of rotor core segments 123, a plurality of permanent magnets 124, and a first frame 121, and a second frame 122.

The plurality of rotor core segments 123 are arranged apart from each other along a circumferential direction of the rotor 120 on an outer side of the stator 110 to form permanent magnet arrangement slots (MS). As the plurality of rotor core segments 123 are arranged apart from each other along a circumferential direction of the rotor 120, permanent magnet arrangement slots (MS) are formed between the two rotor core segments 123. A permanent magnet arrangement slot (MS) is a region surrounded by a side surface of the two rotor core segments 123, a head 123b of the two rotor core segments 123, and a protrusion 123c of the two rotor core segments 123 disposed adjacent to the permanent magnet arrangement slot (MS).

The plurality of rotor core segments 123 are formed by stacking a plurality of single electric steel sheets (magnetic bodies) along a direction parallel to an axial direction of the rotation shaft. The single electrical steel sheets may have the same shape. However, at least one electric steel sheet disposed at a lower end and at least one electric steel sheet disposed at an upper end with respect to the stacking direction of the electric steel sheets may be larger than other electric steel sheets to support the permanent magnet 124.

For example, seventy eight electrical steel sheets may be stacked to construct the rotor core segment 123 having a height of 39 mm with a single electrical steel sheet having a thickness of 0.5 mm in a direction parallel to an axial direction of the rotation shaft.

The rotor core segment 123 performs the role of concentrating a force of the permanent magnets 124. When the force of the permanent magnet 124 is concentrated on the rotor core segment 123, the performance of the motor 100 dramatically increases. However, when the plurality of rotor core segments 123 are connected to each other, the efficiency of the motor 100 is reduced. In some implementations, in order to improve the efficiency of the motor 100, the plurality of rotor core segments 123 may be spaced from each other.

Referring to FIG. 3, each rotor core segment 123 includes a body 123a, a head 123b, a protrusion 123c, a rotor core hole 123d, a rotor core slot 123e, and a mac 123f.

The body 123a corresponds to a portion occupying the largest volume of the rotor core segment 123. The body 123a is disposed to face the permanent magnet 124 in a circumferential direction of the rotor 120. Both side surfaces of the body 123a are disposed to face a first working surface 124a of the permanent magnet 124, and are in surface contact with the first working surface 124a.

It will be understood that the plurality of rotor core segments 123 are arranged along a side face of the hollow cylinder. A portion located on a circumference corresponding to an inner diameter of the cylinder corresponds to an inner end of the body 123a. Furthermore, an outer end of the body 123a indicates a portion formed with the protrusion 123c and the rotor core slot 123e to be described later. The inner end of the body 123a is disposed to face the stator 110 at a position spaced apart from the stator 110.

A width of the body 123a with respect to a circumferential direction of the rotor 120 may be formed to gradually increase from the inner end to the outer end of the body 123a. For instance, a linear distance between both side surfaces of the body 123a in a circumferential direction of the rotor 120 gradually increases from the inner end to the outer end of the body 123a.

When an imaginary first circumference corresponding to an inner end of the rotor core segment 123 is compared with an imaginary second circumference corresponding to an outer end of the rotor core segment 123, the second circumference is larger than the first circumference. When the first working surface 124a of the permanent magnet 124 may extend along a direction parallel to a radial direction of the rotor 120, an area based on a difference between the first circumference and the second circumference may be filled by the rotor core segment 123. A width of the body 123a with respect to a circumferential direction of the rotor 120 to fill the area may gradually increase from the inner end to the outer end. Accordingly, the plurality of rotor core segments 123 and the plurality of permanent magnets 124 in a circumferential direction of the rotor 120 may be arranged without a hollow space.

The head 123b may protrude from an inner end of the body 123a to both sides thereof toward a circumferential direction of the rotor 120. A single rotor core segment 123 may include two heads 123b.

Two heads 123b may be disposed at positions facing an inner surface of the permanent magnet 124 with respect to a single permanent magnet 124. The two heads 123b restrict the movement of the permanent magnet 124 toward the rotation shaft. Either one of the two heads 123b corresponds to a head 123b of the rotor core segment 123 disposed on one side of the permanent magnet 124, and the other one corresponds to a head 123b of the rotor core segment 123 disposed on the other side of the permanent magnet 124.

The two heads 123b are disposed apart from each other in a circumferential direction of the rotor 120. When the two heads 123b are connected to each other, the performance of the motor 100 is deteriorated. In order to maximize the performance of the motor 100, in some implementations, all the rotor core segments 123 are spaced apart from each other and all the permanent magnets 124 are spaced apart from each other. In some implementations, from the viewpoint of the performance of the motor 100, the two heads 123b may be also spaced apart from each other.

The protrusion 123c may protrude from an outer end of the body 123a. The protrusion 123c may extend in two directions toward a direction away from each other to form the rotor core slot 123e. One rotor core segment 123 may include two protrusions 123c. The two protrusions 123c are protruded toward a direction inclined to a radial direction of the rotor 120. Both side surfaces of the protrusion 123c are arranged to face the second working surface 124b of the permanent magnet 124, and are in surface contact with the second working surface 124b.

Two protrusions 123c may be disposed at a position facing an outer surface of one permanent magnet 124 with respect to the permanent magnet 124. The two protrusions 123c restrain the permanent magnet 124 that is about to move toward a direction away from the rotation shaft due to a centrifugal force during the operation of the motor 100. Either one of the two protrusions 123c corresponds to a protrusion 123c of the rotor core segment 123 disposed on one side of the permanent magnet 124, and the other one of the two protrusions 123c corresponds to a protrusion 123c disposed on the other side of the permanent magnet 124.

The two protrusions 123c may be disposed apart from each other in a circumferential direction of the rotor 120. In some cases, when the two protrusions 123c are connected to each other, the performance of the motor 100 may be deteriorated. In some implementations, to maximize the performance of the motor 100, all the rotor core segments 123 may be spaced apart from each other and all the permanent magnets 124 are spaced apart from each other. In some implementations, for the performance of the motor 100, the two protrusions 123c may be also spaced apart from each other.

In some examples, the rotor core hole 123d may be defined in the body 123a. The rotor core hole 123d is open toward a direction parallel to an axial direction of the rotation shaft (in a vertical direction in FIGS. 2 and 3). The rotor core hole 123d may be located between inner and outer ends of the body 123a in a radial direction of the rotor 120. The rotor core slot 123e may be located at an outer end of the body 123a, and thus the hole may be located between an inner end of the body 123a and the rotor core slot 123e in a radial direction of the rotor 120.

The rotor core slot 123e may be located between the two protrusions 123c in a circumferential direction of the rotor 120. It will be understood that the rotor core slot 123e has a shape recessed toward the body 123a between the two protrusions 123c with respect to a radial direction of the rotor 120. A circumference of the rotor core slot 123e may include a curved surface having a cross section of a semicircle or a shape similar to a semicircle.

The rotor core hole 123d and the rotor core slot 123e are regions accommodating a mold pin in an insert injection molding process to be described later or accommodating a molten injection material. For insert injection molding, the plurality of rotor core segments 123 may be seated in a mold, and the plurality of rotor core segments 123 may be fixed in place in the mold. A plurality of mold pins are formed in the mold to fix each rotor core segment 123 in place. When the rotor core segment 123 is placed in the mold to insert each of the mold pins into the rotor core hole 123d or the rotor core slot 123e, the fixing of each rotor core segment 123 is completed.

When the plurality of rotor core segments 123 are seated in place in the mold using the mold pins, and them the molten injection material is injected into the mold, the injection material is filled into the rotor core holes 123d and the rotor core slots 123e. When insert injection molding is completed and an injection product (molded article) is separated from the mold, the rotor core hole 123d and the rotor core slot 123e remain in a region where the mold pin has been present. Furthermore, an inner pillar 121c or an intermediate pillar 122g, which will be described later, is formed in a region filled with the injection material.

The mac 123f may be defined at each single electrical steel sheet of each rotor core segment 123. The mac 123f may be a dimple that is recessed in one side of each steel sheet and protrudes from the other side of each steel sheet. For example, the mac 123f may protrude from one surface of each electrical steel sheet, and may have a protruding shape that is recessed from the other surface at the same position as the protruding position. A plurality of macs 123f may be disposed around the rotor core holes 123d. For example, FIG. 3 illustrates three macs 123f defined on each electrical steel sheet.

The mac 123f is a structure or a mating part for aligning and stacking single electrical steel sheets at positions corresponding to each other. When a plurality of electric steel sheets are stacked in such a manner that either one protruded mac 123f between the two electric steel sheets disposed to face each other is inserted into the other recessed mac 123f, the electrical steel sheets constituting the rotor core segment 123 may be aligned with each other along a direction parallel to an axial direction of the rotation shaft.

The plurality of rotor core segments 123 may be exposed on an inner side of the rotor 120 in a radial direction of the rotor 120. Here, the inner side of the rotor 120 refers to a position at which the bushing 125 is installed.

The plurality of permanent magnets 124 may be inserted one by one into the permanent magnet arrangement slots (MS) formed by the plurality of rotor core segments 123 so as to be arranged along a circumferential direction of the rotor 120. The plurality of permanent magnets 124 and the plurality of rotor core segments 123 are alternately arranged one by one, and thus the same number of permanent magnets 124 and the rotor core segments 123 are provided in the rotor 120.

Each permanent magnet 124 has a first working surface 124a and a second working surface 124b. The magnetic field lines of the permanent magnet 124 are generated from the first working surface 124a and the second working surface 124b.

The first working surface 124a corresponds to the largest surface of the permanent magnet 124. The first working surface 124a faces a circumferential direction of the rotor 120. The first working surface 124a may be parallel to a radial direction of the rotor 120. The first working surface 124a faces a side surface of the body 123a in a circumferential direction of the rotor 120. The first working surface 124a is in surface contact with a side surface of the body 123a.

The second working surface 124b forms a boundary at an obtuse angle with the first working surface 124a. When the second working surface 124b forms a boundary at an obtuse angle with the first working surface 124a, the second working surface 124b may be inclined to a radial direction of the rotor 120. In some examples, a direction toward the rotation shaft may be referred to as an inner direction of the rotor 120, and a direction away from the rotation shaft may be referred to as an outer direction of the rotor 120. The second working surface 124b is formed in an outer direction of the rotor 120 compared to the first working surface 124a. That is, the second working surface 124b may be disposed radially outward of the first working surface 124a.

In some implementations, the first working surface 124a and the second working surface 124b may define an obtuse angle at an interface or boundary, and an edge may be located at the boundary between the first working surface 124a and the second working surface 124b. The edge may extend parallel to an axial direction of the rotation shaft.

When the first working surface 124a and the second working surface 124b form a boundary at an obtuse angle, a width of the permanent magnet 124 based on a circumferential direction of the rotor 120 gradually decreases from a boundary between the first working surface 124a and the second working surface 124b to an outer end of the permanent magnet 124. An outer end of the permanent magnet 124 being gradually decreased by the second working surface 124b corresponds to a gradually increasing protrusion 123c of the rotor core segment 123.

When the plurality of permanent magnets 124 are seen from an inner side of the rotor 120 with respect to a radial direction of the rotor 120, the plurality of permanent magnets 124 are covered by the plurality of rotor core segments 123 and an inner pillar 121c of the first frame 121. Furthermore, when the plurality of permanent magnets 124 are seen from an outer side of the rotor 120, the plurality of permanent magnets 124 are covered by the outer wall 122e of the second frame 122. Here, the inner side of the rotor 120 refers to a position at which the bushing 125 is installed. Furthermore, the outer side of the rotor 120 refers to a position corresponding to an opposite side of the bushing 125 in a radial direction with respect to the plurality of rotor core segments 123 or the plurality of permanent magnets 124.

Each of the plurality of rotor core segments 123 and the plurality of permanent magnets 124 has a first end and a second end in a direction parallel to an axial direction of the rotation shaft. Here, the first end refers to a lower end of the plurality of rotor core segments 123, and a lower end of the plurality of permanent magnets 124, with respect to a direction illustrated in FIG. 2. Furthermore, the second end refers to an upper end of the plurality of rotor core segments 123, and an upper end of the plurality of permanent magnets 124.

However, ordinal numbers, first and second, do not have a special meaning in the ordinal number in that they are added to distinguish each other. Therefore, the upper end of the plurality of rotor core segments 123 and the upper end of the plurality of permanent magnets 124 may be also referred to as a first end. In addition, the lower end of the plurality of rotor core segments 123 and the lower end of the plurality of permanent magnets 124 may be also referred to as a second end.

The first frame 121 fixes the plurality of rotor core segments 123 and the plurality of permanent magnets 124 to integrate the plurality of rotor core segments 123 and the plurality of permanent magnets 124. The first frame 121 is integrated with the plurality of rotor core segments 123 and the plurality of permanent magnets 124.

Here, the meaning of being integrated denotes that a single body is formed by insert injection molding, to be described later. The assembly may be formed by sequentially combining parts with one another and disassembled in the reverse order of the combination. In some implementations, the integrated body differs from the assembly in that it is not disassembled unless damaged at discretion.

The first frame 121 is formed in a hollow cylindrical shape as a whole. The first frame 121 includes a first end cover 121a, a second end cover 121b, a plurality of inner pillars 121c, a plurality of outer pillars 121d, a plurality of first frame holes 121e1, 121e2, and a plurality of permanent magnet fixing jig holes 121f.

The first end cover 121a is formed in an annular shape so as to cover a first end of the plurality of rotor core segments 123 and a first end of the plurality of permanent magnets 124. The first end cover 121a covers the first end of the plurality of rotor core segments 123 and the first end of the plurality of permanent magnets 124 in a direction (at a lower side) parallel to an axial direction of the rotation shaft. The first end cover 121a supports the first end of the plurality of rotor core segments 123 and the first end of the plurality of permanent magnets 124.

The second end cover 121b is formed in an annular shape so as to cover a second end of the plurality of rotor core segments 123 and a second end of the plurality of permanent magnets 124. The second end cover 121b covers the second end of the plurality of rotor core segments 123 and the second end of the plurality of permanent magnets 124 in a direction (at an upper side) parallel to an axial direction of the rotation shaft. The second end cover 121b supports the second end of the plurality of rotor core segments 123 and the second end of the plurality of permanent magnets 124.

The first end cover 121a and the second end cover 121b are formed at positions spaced from each other in a direction parallel to an axial direction of the rotation shaft. The first end cover 121a and the second end cover 121b are disposed to face each other in a direction parallel to an axial direction of the rotation shaft. The movement of the plurality of rotor core segments 123 and the movement of the plurality of permanent magnets 124 in a direction parallel to an axial direction of the rotation shaft is prevented by the first end cover 121a and the second end cover 121b.

The plurality of inner pillars 121c are extended in a direction parallel to an axial direction of the rotation shaft so as to connect an inner end of the first end cover 121a and an inner end of the second end cover 121b to each other. Here, the inner end refers to a circumferential portion corresponding to an inner diameter of the first frame 121.

The plurality of inner pillars 121c are formed at positions spaced apart from each other along a circumferential direction of the first frame 121. Here, the circumferential direction of the first frame 121 refers to a circumferential direction of the inner end of the first end cover 121a and/or a circumferential direction of the inner end of the second end cover 121b.

Since the plurality of inner pillars 121c are spaced apart from each other, an opening (IO) is formed for each region defined by the inner end of the first end cover 121a, the inner end of the second end cover 121b, and the inner pillar 121c. This opening (IO) may be named as an inner opening (IO) to be distinguished from an outer opening (OO) which will be described later.

The inner end of the plurality of rotor core segments 123 are exposed in a radial direction of the rotor 120 through the inner opening (IO). The inner end of the rotor core segment 123 refers to an inner end of the body 123a. The inner end of the rotor core segment 123 exposed in a radial direction of the rotor 120 faces the stator 110.

Referring to FIG. 2, the plurality of rotor core segments 123 and the plurality of inner pillars 121c are alternately formed one by one along a circumferential direction of the first frame 121. Furthermore, the plurality of permanent magnets 124 are covered by the plurality of rotor core segments 123 and the plurality of inner pillars 121c in a radial direction of the first frame 121.

Referring to FIG. 4, an inner end of each rotor core segment 123 and each inner pillar 121c are in surface contact with each other in an inclined direction with respect to a radial direction of the first frame 121. Accordingly, the plurality of inner pillars 121c support the plurality of rotor core segments 123 in a radial direction. Furthermore, the movement of the plurality of rotor core segments 123 toward an inner side of the first frame 121 (toward the rotation shaft) is prevented by the plurality of inner pillars 121c.

The plurality of outer pillars 121d are extended in a direction parallel to an axial direction of the rotation shaft so as to connect an outer end of the first end cover 121a and an outer end of the second end cover 121b to each other. Here, the outer end refers to a circumferential portion corresponding to an outer diameter of the first frame 121. Since the plurality of inner pillars 121c are formed at an inner end of the first frame 121 and the plurality of outer pillars 121d are formed at an outer end of the first frame 121, the plurality of inner pillars 121c and the plurality of outer pillars 121d are formed at positions spaced apart from each other in a radial direction of the first frame 121.

The plurality of outer pillars 121d are formed at positions spaced apart from each other along a circumferential direction of the first frame 121. Accordingly, an outer opening (OO) is formed each between the two outer pillars 121d. The protrusions 123c of the rotor core segment 123 and the outer ends of the permanent magnets 124 are protruded in a radial direction of the first frame 121 through the outer openings (OO). Here, the circumferential direction of the first frame 121 refers to a circumferential direction of the outer end of the first end cover 121a and/or a circumferential direction of the outer end of the second end cover 121b, similar to the above.

The plurality of outer pillars 121d are provided in the same number as that of the plurality of rotor core segments 123. Furthermore, referring to FIG. 4, each of the outer pillars 121d is inserted into the rotor core slot 123e formed between two protrusions 123c of each rotor core segment 123. Accordingly, the plurality of outer pillars 121d support the plurality of rotor core segments 123 in a radial direction. Furthermore, the movement of the plurality of rotor core segments 123 in an outward direction of the first frame 121 toward the rotation shaft is prevented by the plurality of outer pillars 121d.

The plurality of inner pillars 121c and the plurality of outer pillars 121d are alternately formed one by one along a circumferential direction of the first frame 121. This is because each of the inner pillars 121c is formed one by one each between the inner ends of the two rotor core segments 123, and each of the outer pillars 121d is formed at a position corresponding to the rotor core slot 123e of the rotor core segment 123. The alternate arrangement of the inner pillar 121c and the outer pillar 121d increases the structural strength of the first frame 121.

The plurality of first frame holes 121e1, 121e2 are formed in the first end cover 121a and the second end cover 121b, respectively. The first frame holes 121e1 formed in the first end cover 121a and the plurality of first frame holes 121e2 formed in the second end cover 121b are formed at positions facing each other in a direction parallel to an axial direction of the rotation shaft. The first frame holes 121e1 formed in the first end cover 121a and the plurality of first frame holes 121e2 formed in the second end cover 121b are formed at positions spaced apart from each other along a circumferential direction of the first frame 121.

The plurality of first frame holes 121e1, 121e2 are formed at positions facing each other in a direction parallel to an axial direction of the rotation shaft and the rotor core holes 123d formed in the plurality of rotor core segments 123. The first frame holes 121e1, 121e2 and the rotor core holes 123d of the rotor core segment 123 are located at positions where mold pins (or jigs) are originally disposed at the time of insert injection molding for manufacturing the rotor 120.

Even though a molten raw material for insert injection molding is filled in the mold, the molten raw material cannot exist at the positions where the mold pins exist. Therefore, when insert injection molding is completed and an injection product (molded article) is separated from the mold, the first frame holes 121e1, 121e2 and the rotor core holes 123d of the rotor core segment 123 remain in a region where the mold pins have been present.

The plurality of permanent magnet fixing jig holes 121f are formed at boundaries between the first end cover 121a and the plurality of inner pillars 121c. The plurality of permanent magnet fixing jig holes 121f are formed at positions corresponding to the respective permanent magnets 124 in a radial direction of the first frame 121.

A permanent magnet fixing jig for fixing the plurality of permanent magnets 124 may be formed on a primary mold for primary insert injection molding. The permanent magnet fixing jig closely adheres each of the permanent magnets 124 seated on the mold to the mold along a direction parallel to an axial direction of the rotation shaft. Therefore, each of the permanent magnets 124 may be fixed along this direction.

Even though the molten raw material for insert injection molding is filled in the mold, the molten raw material cannot exist at the position where the permanent magnet fixing jig exists. Therefore, as a result of insert injection molding, the permanent magnet fixing jig hole 121f remains. The protrusions 122h of the second frame 122 which will be described later are inserted into the permanent magnet fixing jig holes 121f.

The second frame 122 surrounds a plurality of rotor core segments 123, a plurality of permanent magnets 124, and a first frame 121 to integrate the plurality of rotor core segments 123, the plurality of permanent magnets 124, and the first frame 121. The plurality of rotor core segments 123, the plurality of permanent magnets 124, and the first frame 121 are fixed by the second frame 122. A difference between the integrated body and the assembly has been described above.

Furthermore, it has been described that the first frame 121 is also formed by insert injection molding. If the process of forming the first frame 121 is referred to as a primary insert injection molding, the second frame 122 is formed by secondary insert injection molding. This will be described later.

The second frame 122 is formed in a cylindrical shape having an entire hollow and any one underside. The second frame 122 includes a bushing coupling portion 122a, a spoke 122b, a first end base 122c, a second end base 122d, an outer wall 122e, a plurality of outer end receiving portions 122f, a plurality of intermediate pillars 122g, a plurality of protrusions 122h, and a plurality of primary injection product fixing jig holes 122i.

The bushing coupling portion 122a is formed at the center of the second frame 122 in a radial direction of the rotor 120. The center of the second frame 122 corresponds to a position facing the region surrounded by the stator 110.

The bushing coupling portion 122a is configured to engage with the bushing 125. The bushing 125 refers to a part connected to the rotation shaft. One end of the rotation shaft may be coupled to the bushing 125, and the other end may be directly connected to an object to be supplied with a rotational force of the motor 100, such as a drum of the washing machine.

The bushing 125 may have a shape similar to a hollow cylinder. The bushing 125 has a thread 125a on an inner circumferential surface of the hollow so as to couple to the rotation shaft. The rotation shaft is inserted directly into the bushing 125. The rotation shaft and the second frame 122 are coupled to each other through the bushing 125.

A first reinforcing rib 122a1 is formed around the bushing coupling portion 122a. A plurality of first reinforcing ribs 122a1 are formed around the bushing coupling portion 122a, and a plurality of first reinforcing ribs 122a1 are protruded from a boundary between the bushing coupling portion 122a and the spokes 122b along a direction inclined to the rotation shaft.

The spokes 122b may extend in a radial direction from the bushing coupling portion 122a or extended toward a direction inclined at an acute angle with respect to the radial direction. A plurality of spokes 122b are provided therein, and may be arranged around the bushing coupling portion 122a so as to face different directions. The spokes 122b are formed at positions covering one side or the other side of the stator 110 in a direction parallel to an axial direction of the rotation shaft. With respect to a direction illustrated above in FIG. 1, a lower side of the stator 110 corresponds to the one side, and an upper side of the stator 110 corresponds to the other side. In this case, the spoke 122b is formed at a position covering a lower side of the stator 110 from below.

A second reinforcing rib 122b1 may be formed on the spoke 122b. The second reinforcing rib 122b1 may be protruded from the spoke 122b in a direction parallel to an axial direction of the rotation shaft and extended toward the bushing coupling portion 122a.

When a plurality of spokes 122b are formed in a radial direction around the bushing coupling portion 122a, a heat dissipation hole 122b2 is formed between the plurality of spokes 122b. Heat generated from the motor due to the operation of the motor may be discharged through the heat dissipation hole 122b2.

The first end base 122c is formed in an annular shape along a circumferential direction of the rotor so as to cover the first end cover 121a. The first end base 122c is formed on an outer circumference of the spokes 122b. The first end base 122c supports the first end cover 121a.

The second end base 122d is formed in an annular shape along a circumferential direction of the rotor 120 so as to cover the second end cover 121b. The second end base 122d supports the second end cover 121b.

The first end base 122c and the second end base 122d are formed at positions spaced apart from each other in a direction parallel to an axial direction of the rotation shaft. The first end base 122c and the second end base 122d are disposed to face each other in a direction parallel to an axial direction of the rotation shaft. The movement of the first frame 121 in a direction parallel to an axial direction of the rotation shaft is prevented by the first end base 122c and the second end base 122d.

The outer wall 122e is formed to surround an outer end of the first frame 121 in a radial direction of the rotor 120. For instance, the outer wall 122e may extend in a direction parallel to an axial direction of the rotation shaft so as to connect the first end base 122c and the second end base 122d to each other, and extended along an outer end of the first end base 122c and an outer end of the second end base 122d.

The outer wall 122e surrounds the protrusions 123c of the plurality of rotor core segments 123, an outer end of the plurality of permanent magnets 124, and an outer end of the first frame 121 in a radial direction of the rotor 120. Furthermore, the outer wall 122e is formed at the outermost of the second frame 122. Therefore, the plurality of rotor core segments 123, the plurality of permanent magnets 124, and the first frame 121 are all covered by the outer wall 122e on an outer side of the rotor 120.

The plurality of outer end receiving portions 122f are formed on an inner circumferential surface of the outer wall 122e. The plurality of outer end receiving portions 122f are formed in a recessed shape from an inner circumferential surface of the outer wall 122e toward an outer circumferential surface of the outer wall 122e. A boundary wall 122j is formed each between each outer end receiving portion 122f. The boundary wall 122j may extend along a direction parallel to an axial direction of the rotation shaft.

The boundary wall 122j is protruded in an inward direction of the second frame 122 compared to the outer end receiving portion 122f and inserted between the two protrusions 123c of the rotor core segment 123. Accordingly, the outer pillar 121d of the first frame 121 and the boundary wall 122j of the second frame 122 are inserted into the rotor core slot 123e of the rotor core segment 123. The outer pillar 121d of the first frame 121 is disposed closer to the rotation shaft than the boundary wall 122j of the second frame 122 with respect to a radial direction of the second frame 122.

Referring to FIG. 4, an outer end (D) of any one permanent magnet 124, a protrusion (E) in contact with the outer end (D) of the any one permanent magnet 124 between the two protrusions 123c of the rotor core segment 123 disposed on one side of the any one permanent magnet 124, and a protrusion (F) in contact with the outer end (D) of the any one permanent magnet 124 between the two protrusions 123c of the rotor core segment 123 disposed on the other side of the any one permanent magnet 124 are inserted into any one of the outer end receiving portion 122f.

The plurality of intermediate pillars 122g are disposed between an inner end of the first end base 122c and the outer wall 122e or between an inner end of the second end base 122d and the outer wall 122e in a radial direction of the second frame 122. At this position, each intermediate pillar 122g may extend in a direction parallel to an axial direction of the rotation shaft to connect the first end base 122c and the second end base 122d to each other through the rotor core hole 123d of the rotor core segment 123 and the first frame holes 121e1, 121e2. The plurality of intermediate pillars 122g are disposed one by one in the rotor core hole 123d of each rotor core segment 123. The plurality of intermediate pillars 122g are disposed apart from each other along a circumference of the second frame 122.

The plurality of protrusions 122h are protruded from an inner end of the first end base 122c along a direction parallel to an axial direction of the rotation shaft and inserted into the permanent magnet fixing jig holes 121f of the first frame 121. As the plurality of permanent magnet fixing jig holes 121f are formed at positions spaced apart from each other along an inner end of the first end cover 121a, the plurality of protrusions 122h are also formed at positions spaced apart from each other along an inner end of the first end base 122c.

The permanent magnet fixing jig hole 121f is formed by a permanent magnet fixing jig of the mold as a result of primary insert injection molding for forming the first frame 121. However, as a molten injection material injected into the mold is filled in the respective permanent magnet fixing jig holes 121f as a result of secondary insert injection molding for forming the second frame 122, the plurality of protrusions 122h for closing the permanent magnet fixing jig holes 121f are formed.

The plurality of primary injection product fixing jig holes 122i are formed in the first end base 122c. The plurality of primary injection product fixing jig holes 122i are open along a direction parallel to an axial direction of the rotation shaft. The plurality of primary injection product fixing jig holes 122i are formed at positions spaced apart from each other along a circumferential direction of the first end base 122c. The plurality of primary injection product fixing jig holes 122i are formed between an inner end of the first end base 122c and an outer wall 122e of the first frame 121.

When the primary insert injection molding is completed in a primary mold, a primary injection product in which the plurality of rotor core segments 123, the plurality of permanent magnets 124, and the first frame 121 are integrated with each other is manufactured. In order to inject this primary injection product into a secondary mold to perform secondary insert injection molding, the primary injection product may be fixed in the secondary mold. A primary injection product fixing jig is formed in the secondary mold to fix the primary injection product.

When a molten injection material is injected into the secondary mold to perform secondary insert injection molding, the molten injection material cannot exist in a region where the primary injection product fixing jig exists. As a result, subsequent to the completion of secondary insert injection molding, the plurality of primary injection product fixing jig holes 122i remain in the second frame 122.

Figure 6:
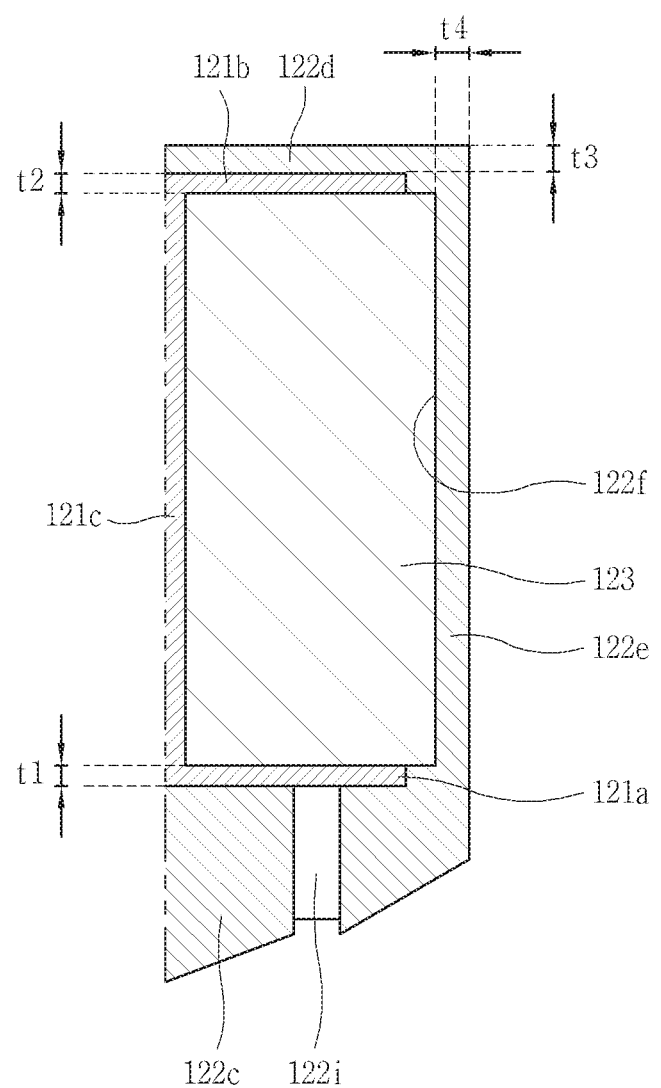
FIG. 6 is a cross-sectional view of section C in FIG. 2.

FIG. 6 is a cross-sectional view of section C in FIG. 2.

In the first frame 121, a thickness of the first end cover 121a is t1, and a thickness of the second end cover 121b is t2. The thickness of the first end cover 121a and the thickness of the second end cover 121b are based on a direction parallel to the axial direction.

The role of the first frame 121 is to fix the plurality of rotor core segments 123 and the plurality of permanent magnets 124 for secondary insert injection molding and to improve the structural strength of the rotor 120 to prevent the scattering of the plurality of rotor core segments 123 and the plurality of permanent magnets 124 due to a strong centrifugal force acting on the rotor 120 subsequent to the secondary insert injection molding.

With this point of view, in some implementations, t1 and t2 may be at least 1.5 mm or more. A thickness of less than 1.5 mm is insufficient to improve the structural strength of the rotor 120. As the thickness of t1 and t2 increases, the plurality of rotor core segments 123 and the plurality of permanent magnets 124 may be more securely fixed. Therefore, t1 and t2 are technically significant only at the lowest limit.

In the second frame 122, it is shown that a thickness of the second base is t3 and a thickness of the outer wall 122e is t4. The thickness of the second base is based on a direction parallel to the axial direction. A thickness of the outer wall 122e is based on a radial direction of the second frame 122.

The role of the second frame 122 is to improve the dimensional accuracy of the motor 100 having a relatively large outer diameter by suppressing molding shrinkage that occurs upon secondary injection molding and suppressing dimensional deformation subsequent to secondary insert injection molding. Moreover, the role of the second frame 122 is to prevent the scattering of the plurality of rotor core segments 123 and the plurality of permanent magnets 124 together with the first frame 121 due to a strong centrifugal force acting on the rotor 120.

With this point of view, in some implementations, t3 may be 1.5 mm to 7.5 mm, and t4 may be 2.3 mm to 3.3 mm. As t3 and t4 increase, the safety factor of the motor 100 increases. However, when t3 and t4 exceed the upper limit, the motor 100 may become excessively large in size.

Here, the safety factor is a concept for determining whether the structural strength of the motor 100 is improved or not. The safety factor is defined as a ratio (T/S) of the tensile strength (T) of the rotor 120 to the stress (S) applied to the rotor 120 during the operation of the motor 100. When the safety factor is measured while t1 and t2 are set to the minimum value of 1.5 mm and t3 and t4 are changed from the minimum value to the maximum value, the safety factor of the rotor formed by only one injection molding is increased to about 1.5 to 4.8 times.

Hereinafter, the manufacturing process of the rotor 120 will be described.

Figure 7A:
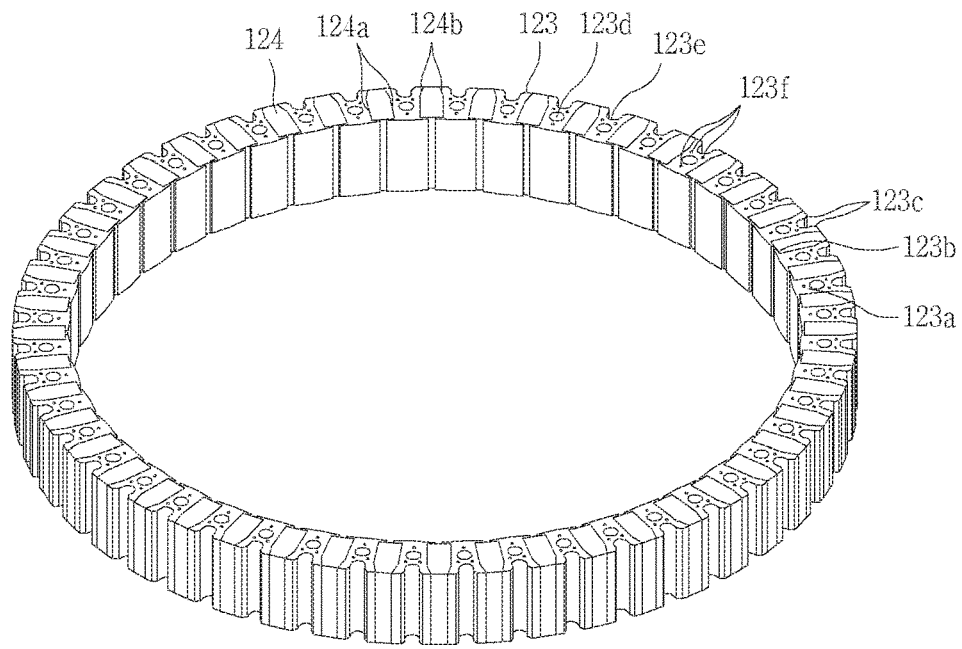
FIGS. 7A to 7C are views sequentially showing examples of a primary insert injection molding process and a secondary insert injection molding process for manufacturing the rotor.
Figure 7B:
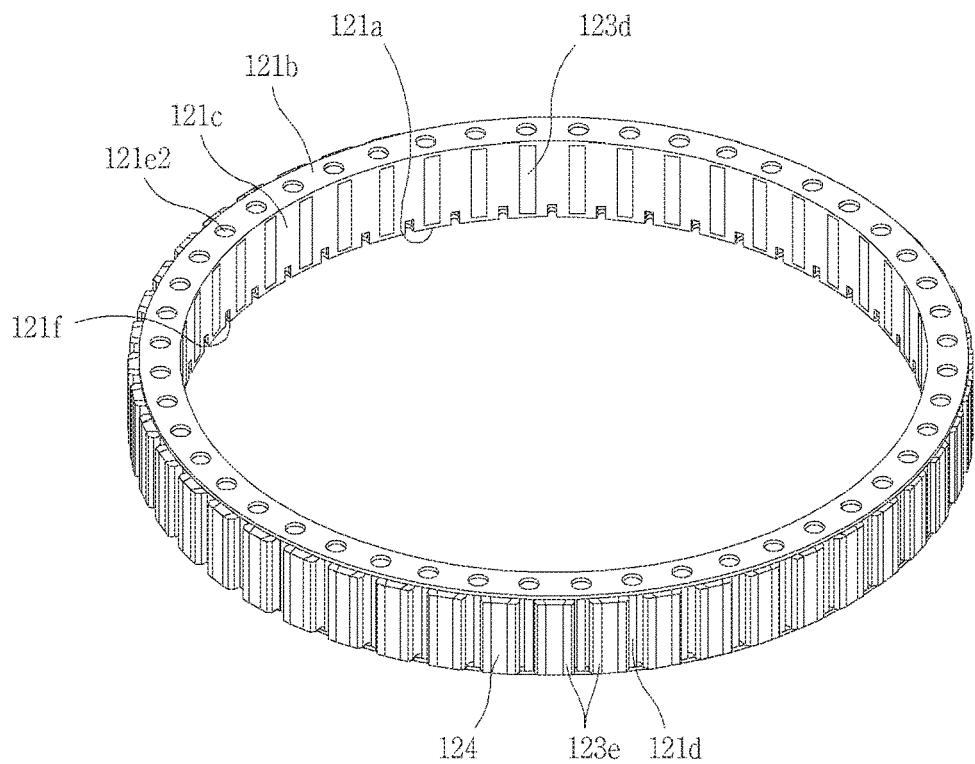
Figure 7C:
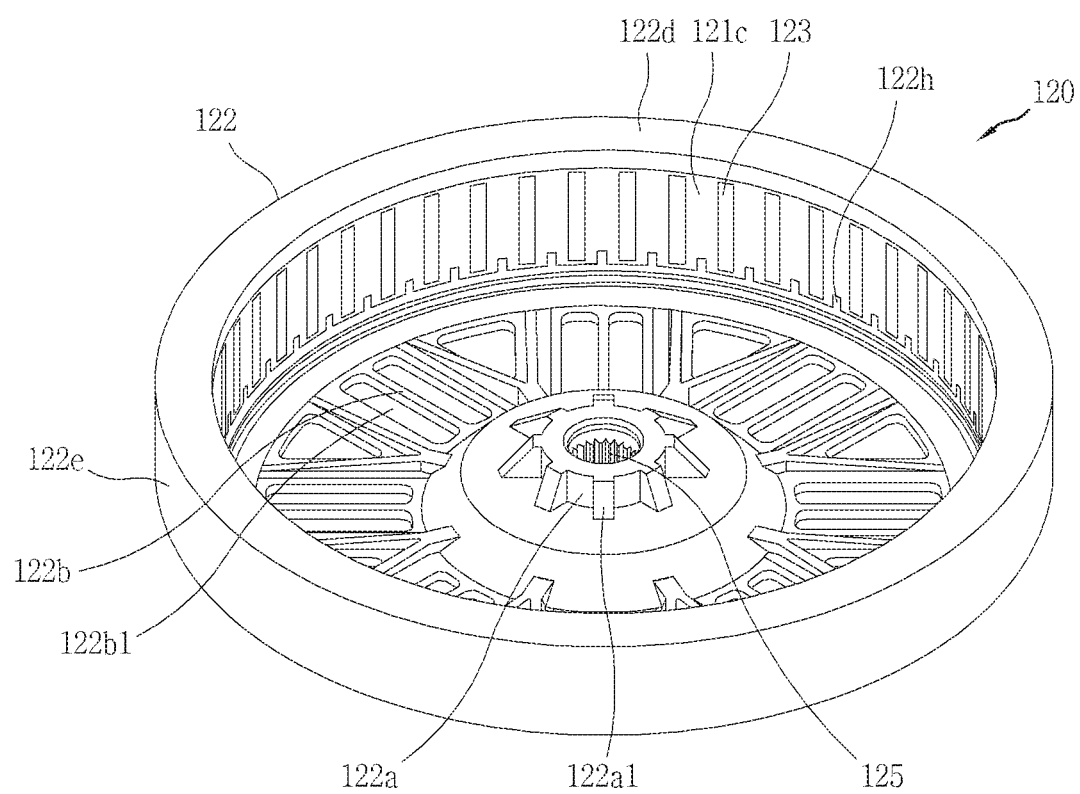

FIGS. 7A through 7C are views sequentially showing a primary insert injection molding process and a secondary insert injection molding process for manufacturing the rotor 120. For reference, a mold for forming the first frame 121 is referred to as a primary mold, and insert injection molding performed in the primary mold to form the first frame 121 is referred to as primary insert injection molding. Furthermore, a mold for forming the second frame 122 is referred to as a secondary mold, and insert injection molding performed in the secondary mold to form the second frame 122 is referred to as secondary insert injection molding.

Injection molding is a type of method of molding a resin, and refers to a method of cooling and solidifying a molten raw material in a mold at a high pressure to produce a molded article having a shape corresponding to the mold. A molded article produced by injection molding is referred to as an injection product.

Insert injection molding refers to a method of injecting an insert component together with a molten raw material into a mold to produce a molded article. The injection product has a shape corresponding to a mold, and is produced while an insert component is integrated with an injection product inside the injection product.

Referring to FIG. 7A, the plurality of rotor core segments 123 and the plurality of permanent magnets 124 are alternately arranged one by one along an arbitrary circumferential direction. A side surface corresponding to the working surface 124a of the permanent magnet 124 is brought into close contact with a side surface of the rotor core segment 123.

The positions of the plurality of rotor core segments 123 are fixed by a fixing jig of the rotor core segment 123 in the primary mold. The rotor core segment 123 fixing jig corresponds to a mold pin formed in the mold. When a plurality of rotor core segment 123 fixing jigs are formed in the primary mold along a circumferential direction corresponding to a circumference arranged with the plurality of rotor core segments 123, each of the rotor core segment 123 fixing jigs may be inserted into the rotor core hole 123d of the each rotor core segment 123.

Since an inner end of each rotor core segments 123 is protruded to both sides along the circumferential direction, the radial movement of each permanent magnet 124 toward the point where the rotation shaft disposed each between the two rotor core segments 123 is to be disposed will be restricted.

Furthermore, the protrusion 123c of each of the rotor core segments 123 is formed in two sections extended in an inclined manner in a direction away from each other, and each of the permanent magnets 124 has a second working surface corresponding to the protrusion 123c of the rotor core segment 123. Therefore, the radial movement of the plurality of permanent magnets 124 facing a direction opposite to the point where the rotation shaft is to be disposed will be also restricted.

A plurality of permanent magnet fixing jigs are formed in a mold for primary insert injection molding. The plurality of permanent magnet fixing jigs are formed in a number corresponding to that of the plurality of permanent magnets 124. The plurality of permanent magnet fixing jigs fix the plurality of permanent magnets 124 in a direction parallel to an axial direction of the rotation shaft.

Since the plurality of rotor core segments 123 and the plurality of permanent magnets 124 are in close contact with each other, the positions of the plurality of rotor core segments 123 and the plurality of permanent magnets 124 may be fixed at the same time. The plurality of rotor core segments 123 and the plurality of permanent magnets 124 are all fixed in three directions (a circumferential direction, a radial direction, a direction parallel to an axial direction of the rotation shaft) as described above.

Additionally, an outer end of each permanent magnet 124 is fixed to the primary mold together with one protrusion 123c of the rotor core segment 123 adjacent to one side thereof, and one protrusion 123c of the rotor core segment 123 adjacent to the other side thereof. The protrusion 123c of each rotor core segment 123 is fixed by the primary mold except for the position where the outer pillar 121d of the first frame 121 is to be formed.

A primary injection material melted while the plurality of rotor core segments 123 and the plurality of permanent magnets 124 are fixed to the primary mold is injected into the primary mold to perform primary insert injection molding.

Next, referring to FIG. 7B, the first insert is formed in the first frame 121 by the primary insert injection molding performed in the primary mold. The rotor core holes 123d of the plurality of rotor core segments 123 are separated from the primary mold while being empty due to the rotor core fixing jig of the primary mold, and the first frame holes 121e1, 121e2 also remain in the first end cover 121a and the second end cover 121b of the first frame 121.

The outer pillars 121d of the first frame 121 are inserted into the rotor core slots 123e of the plurality of rotor core segments 123, respectively. The outer pillar 121d may have a semicircular pillar shape. In addition, the inner pillar 121c of the first frame 121 is formed between an inner end of the rotor core segments 123 and an inner end of the rotor core segment 123 adjacent thereto.

The first frame 121 is integrated with the plurality of rotor core segments 123 and the plurality of permanent magnets 124. The plurality of rotor core segments 123, the plurality of permanent magnets 124, and the first frame 121 that are integrated with each other may be referred to as a primary injection product. The primary injection produce is fixed to the secondary mold to perform secondary insert injection molding.

A plurality of primary injection product fixing jigs for supporting a primary injection product are formed in the secondary mold instead of jigs inserted into the rotor core holes 123d of the plurality of rotor core segments 123. The primary injection product fixing jigs corresponding to the plurality of rotor core segments 123 in number are provided, and the plurality of rotor core segments 123 are supported by the primary injection product fixing jigs. Since the primary injection product is integrated, the entire primary injection product is supported when the plurality of rotor core segments 123 are fixed by the plurality of primary injection product fixing jigs.

When a molten secondary injection material is injected while the primary injection product is fixed to the secondary mold, the secondary injection material fills an empty space formed in the primary injection product. For instance, secondary insert injection molding is performed while the secondary injection material is filled in the rotor core hole 123d formed in each of the rotor core segments 123 or the permanent magnet fixing jig hole 121f of the first frame 121.

Finally, referring to FIG. 7C, the second frame 122 is formed by the secondary insert injection molding performed in the secondary mold. The molten secondary injection material fills the rotor core hole 123d of each rotor core segment 123 to form a plurality of intermediate pillars 122g of the second frame 122. Alternatively, the secondary injection material fills each of the permanent magnet fixing jig holes 121f of the first frame 121 to form a plurality of protrusions 122h. Alternatively, an outer end receiving portion 122f is formed on an inner surface of the outer wall 122e. In addition, the primary injection product fixing jig holes 122i remain in the first end base 122c of the second frame 122.

Holes corresponding to mold pins for fixing parts separated from each other in the mold remain in various directions in the rotor 120 manufactured by only the primary insert injection molding. However, since the rotor 120 manufactured by the secondary insert injection molding as in the present disclosure is already integrated with the primary injection product, there is an advantage that no holes except the primary injection product fixing jig holes 122i remain.

In some examples, the rotor 120 may not be manufactured by single injection molding but manufactured by double injection molding to use different injection materials at the time of the primary insert injection molding and at the injection of the secondary insert injection molding to have the advantages, respectively. Here, the injection material of the primary insert injection molding is a material of the first frame 121. Similarly, the injection material of the secondary insert injection molding is a material of the second frame 122. This will be described below.

The contraction of the injection product (molded article) may occur subsequent to all the injection molding processes, and considering that the first frame 121 has a cylindrical shape with no both undersides, the contraction occurs uniformly only in a direction parallel to an axial direction of the rotation shaft and in the radial direction. Therefore, the size of the first frame 121 may be designed in consideration of the contraction ratio from the beginning, and the molding contraction ratio thereof may be somewhat larger than that of the second frame 122.

With this point of view, in some implementations, the first frame 121 may be made of a material having a tensile strength greater than that of the second frame 122 to firmly fix the plurality of rotor core segments 123 and the plurality of permanent magnets 124.

In some implementations, the second frame 122 may be made of a material having a molding contraction ratio smaller than that of the first frame 121. Considering that the second frame 122 has a cylindrical shape having one underside, there is a possibility that contraction focused on the center of the one underside may occur subsequent to the secondary insert injection molding, and it causes the outer wall 122e of the second frame 122 to be inclined so as to deteriorate the dimensional accuracy of the rotor 120. In order to prevent such a result, the second frame 122 should be formed of a material having a molding contraction ratio smaller than that of the first frame 121 even though the tensile strength is somewhat lower than that of the first frame 121.

In addition, the first frame 121 should be prevented from being deformed by heat during the secondary insert injection molding process. When the first frame 121 is formed of a material having a higher heat deflection temperature than the second frame 122, the deformation of the first frame 121 due to heat during the secondary insert injection molding process may be suppressed.

In consideration of the above conditions, the first frame 121 and the second frame 122 may be made of different types of resin. For example, the first frame 121 may be made of polypropylene (PP), and the second frame 122 may be made of a BMC (Bulk Molding Compound). Polypropylene shrinks subsequent to insert injection molding, but has a higher tensile strength than BMC and has a higher heat deflection temperature than BMC. BMC has low tensile strength or heat deflection temperature compared to polypropylene, but is a material with almost no shrinkage subsequent to insert injection molding.

Various implementations of the rotor will be described below.

The rotors of the first to third implementations are provided depending on which of the first frame and the second frame the intermediate pillar is provided.

Figure 8:
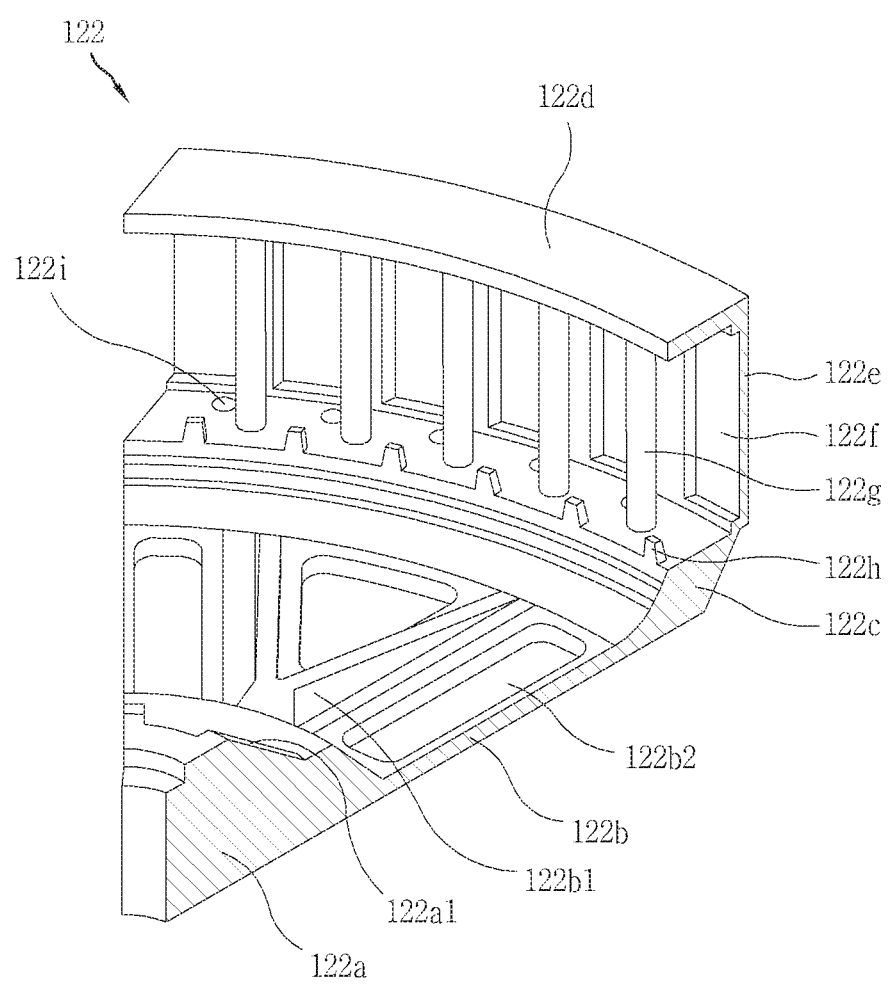
FIG. 8 is a conceptual view showing an example second frame of the rotor.

FIG. 8 is a conceptual view of the second frame 122 provided in the rotor 120 of the first implementation.

The rotor 120 of the first implementation corresponds to the rotor 120 described above in FIGS. 1 through 6.

The intermediate pillar 122g is provided in the second frame 122. In some implementations, the first frame 121 may not include an intermediate pillar. In the rotor 120 of the first implementation compared to the rotor formed by only the primary injection molding, the safety factor improving effect of at least 2.1 times and at most 4.7 times was experimentally measured. The numerical value of the safety factor was experimentally measured within the numerical range described in FIG. 6.

Figure 9A:
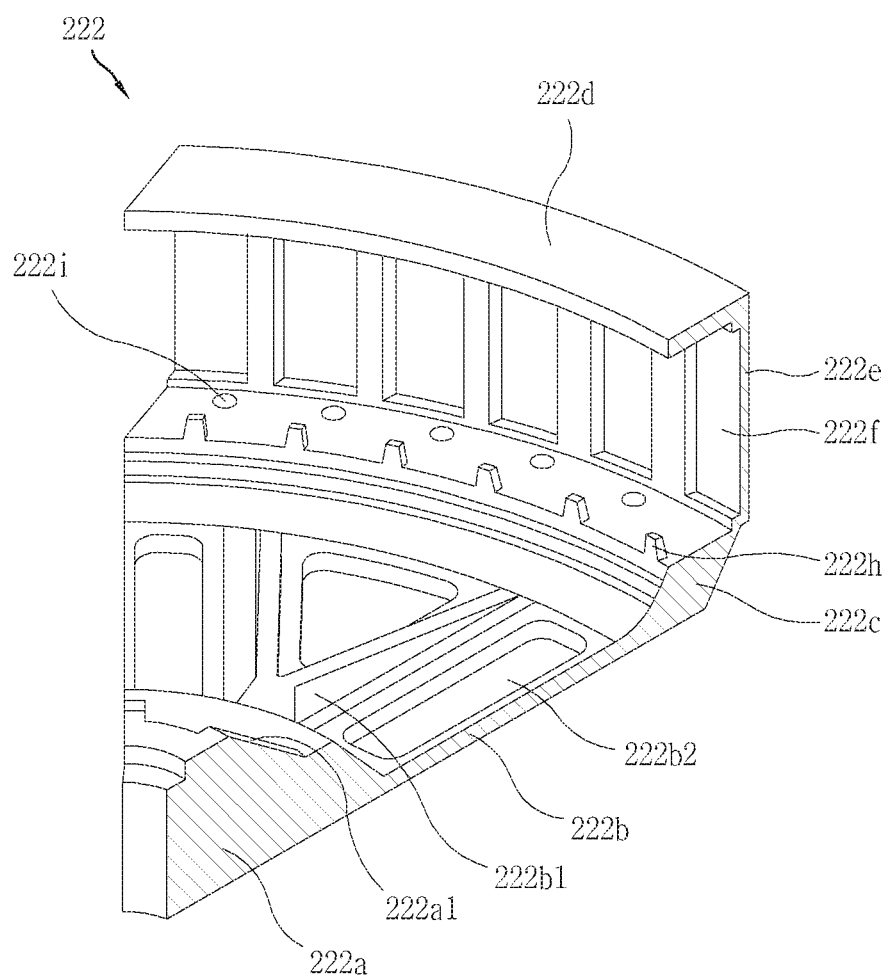
FIG. 9A is a conceptual view showing an example second frame of the rotor.

FIG. 9A is a conceptual view of the second frame 222 provided in the rotor 220 of the second implementation.

Figure 9B:
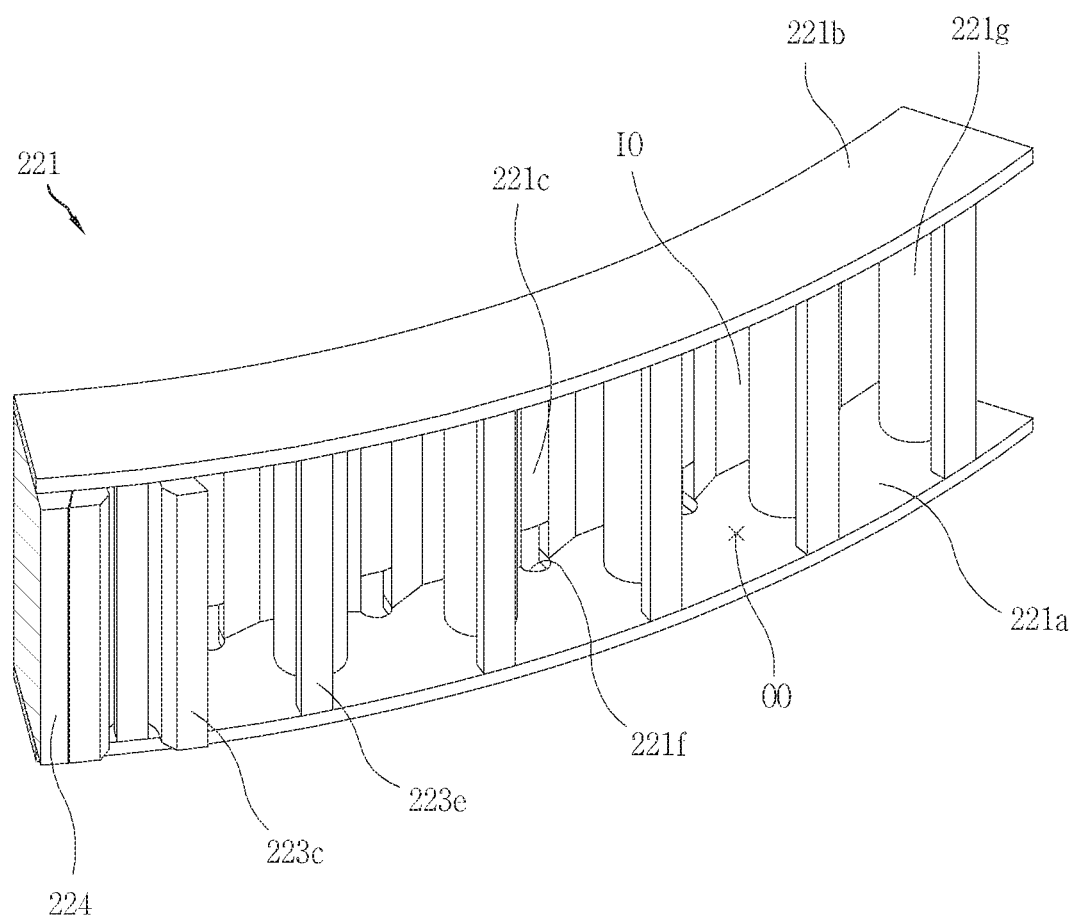
FIG. 9B is a conceptual view showing an example first frame of the rotor.

FIG. 9B is a conceptual view of the first frame 221 provided in the rotor 220 of the second implementation.

The second frame 222 is not provided with an intermediate pillar. Conversely, the first frame 221 is provided with an intermediate pillar 221g.

The intermediate pillar 221g of the first frame 221 may extend in a direction parallel to an axial direction of the rotation shaft to connect the first end cover 221a and the second end cover 221b to each other through the rotor core hole 123d of the rotor core segment 123. The plurality of intermediate pillars 221g are provided in the first frame 221. The intermediate pillar 221g of the first frame 221 is formed between an inner pillar 221c and an outer pillar 221d in a radial direction of the first frame 221. The plurality of intermediate pillars 221g are disposed apart from each other along a circumferential direction of the first frame 221.

In the rotor of the second implementation compared to the rotor formed by only the primary injection molding, the safety factor improving effect of at least 1.4 times through at most 3.3 times was experimentally measured. Similarly, the numerical value of the safety factor was experimentally measured within the numerical range described in FIG. 6.

Referring to FIG. 9A, the second frame 222 includes a bushing coupling portion 222a, a first reinforcing rib 222a1, a spoke 222b, a second reinforcing rib 222b1, a heat dissipation hole 222b2, a first end base 222c, a second end base 222d, an outer wall 222e, an outer end receiving portion 222f, a protrusion 222h, and a primary injection product fixing jig hole 222i.

In FIG. 9B, the first frame 221 includes a permanent magnet fixing jig hole 221f, an inner opening IO, an outer opening OO, an outer end of the rotor core segment 223c, and a permanent magnet 224.

Figure 10A:
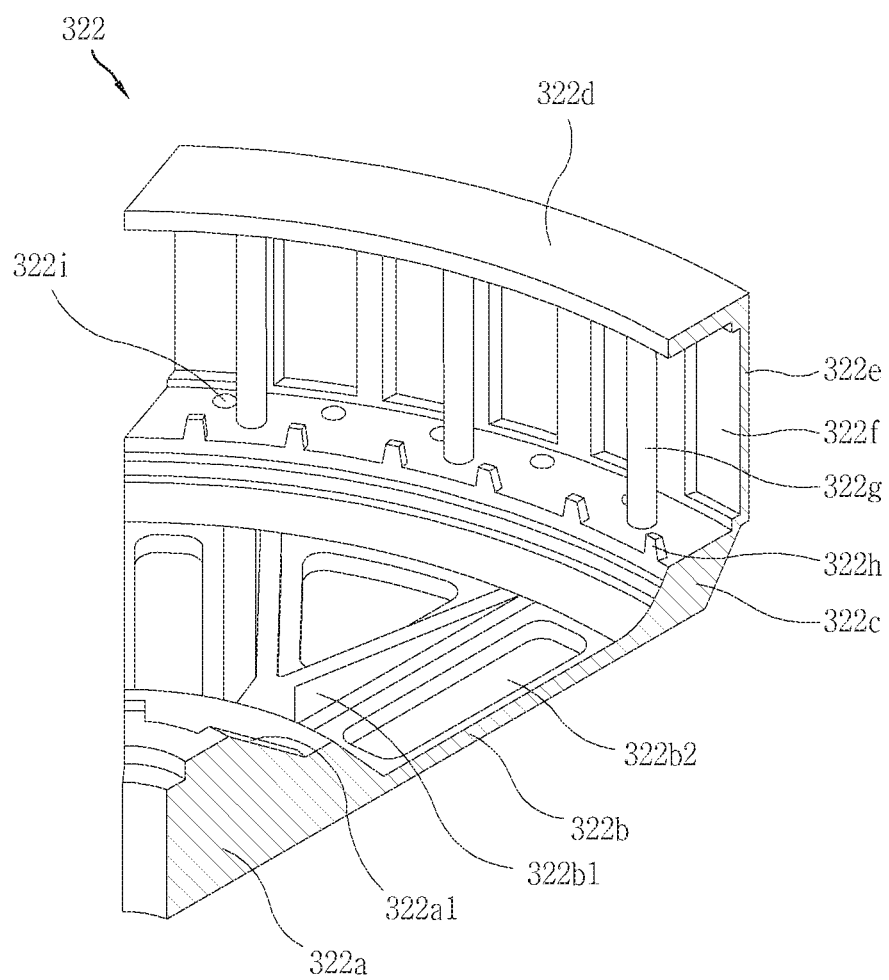
FIG. 10A is a conceptual view showing an example second frame of the rotor.

FIG. 10A is a conceptual view of the second frame 322 provided in the rotor 320 of the third implementation.

Figure 10B:
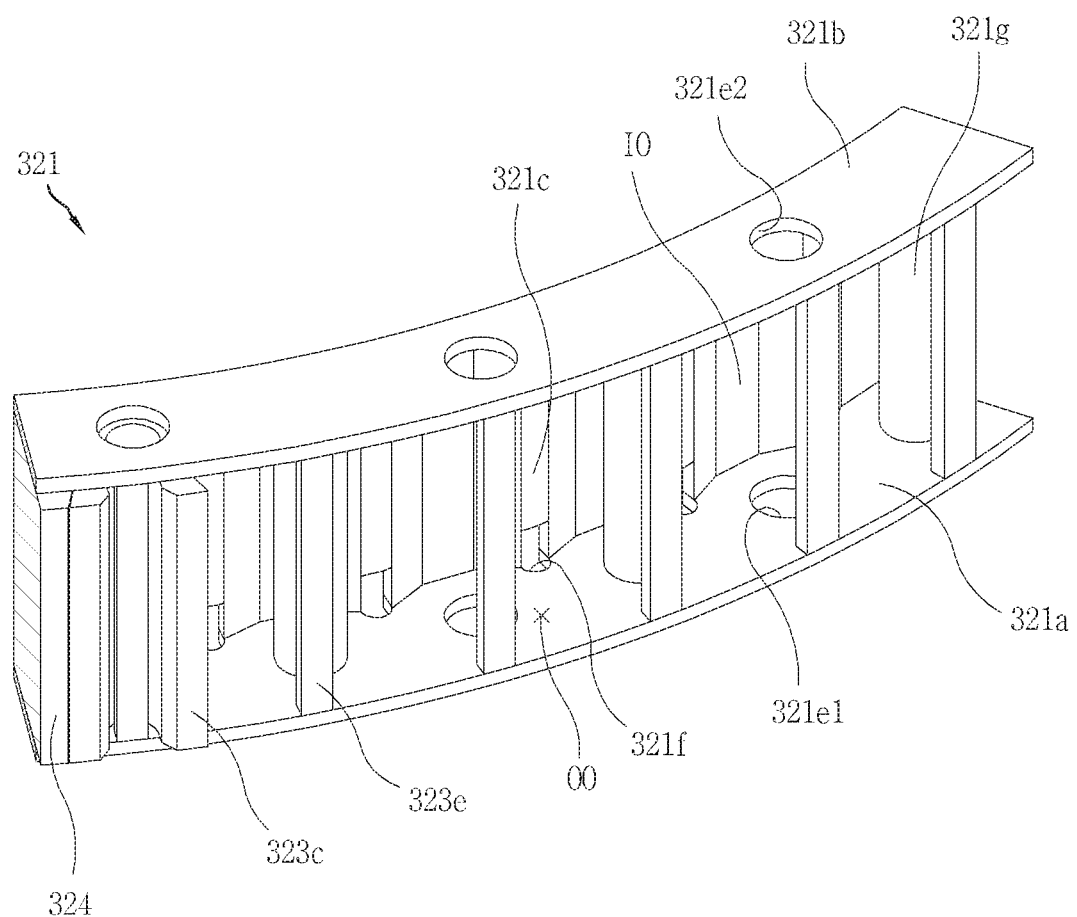
FIG. 10B is a conceptual view showing an example first frame of the rotor.

FIG. 10B is a conceptual view of the first frame 321 provided in the rotor 320 of the third implementation.

The intermediate pillars 321g, 322g are formed in both the first frame 321 and the second frame 322. The intermediate pillar 321g provided in the first frame 321 is referred to as a first intermediate pillar 321g, and the intermediate pillar 322g provided in the second frame 322 is referred to as a second intermediate pillar 322g to distinguish the two intermediate pillars 321g, 322g from each other.

The intermediate pillar 321g may extend in a direction parallel to an axial direction of the rotation shaft to connect the first end cover 321a and the second end cover 321b to each other through the rotor core hole 123d of the rotor core segment 123. The plurality of first intermediate pillars 321g are provided. The plurality of first intermediate pillar 321g are formed between an inner pillar 321c and an outer pillar 321d in a radial direction of the first frame 221. The plurality of first intermediate pillars 321g are disposed apart from each other along a circumferential direction of the first frame 321. The first frame holes 321e1, 321e2 are not formed at the positions where the first intermediate pillars 321g are formed.

In some implementations, the first frame holes 321e1, 321e2 may be defined at the positions where the second intermediate pillars 322g are located. The second intermediate pillar 322g may extend in a direction parallel to an axial direction of the rotation shaft to connect the first end base 322c and the second end base 322d to each other through the rotor core hole 123d of the rotor core segment 123 and the first frame holes 321e1, 321e2. The plurality of second intermediate pillars 322g are provided. The plurality of second intermediate pillars 322g are formed between an inner end of the first end base 322c and the outer wall 322e or between an inner end of the second end base 322d and the outer wall 322e in a radial direction of the second frame 322. The plurality of second intermediate pillars 322g are disposed apart from each other in a circumferential direction of the second frame 322.

The plurality of first intermediate columns 321g and the plurality of second intermediate columns 322g are all arranged on an arbitrary circumference centered on the rotation shaft. For instance, a distance from the rotation shaft to each first intermediate pillar 321g and a distance from the rotation shaft to each second intermediate column 322g are the same. The plurality of first intermediate columns 321g and the plurality of second intermediate columns 322g are alternately formed one by one along a circumferential direction of the rotor. Furthermore, the plurality of first intermediate columns 321g and the plurality of second intermediate columns 322g are alternately disposed along a circumferential direction of the rotor.

In the rotor of the third implementation compared to the rotor formed by only the primary injection molding, the safety factor improving effect of at least 2.2 times and at most 4.8 times was experimentally measured. The numerical value of the safety factor was experimentally measured within the numerical range described in FIG. 6.

In FIG. 10A, the second frame 322 includes a bushing coupling portion 322a, a first reinforcing rib 322a1, a spoke 322b, a second reinforcing rib 322b1, a heat dissipation hole 322b2, an outer end receiving portion 322f, a protrusion 322h, and a primary injection product fixing jig hole 322i.

In FIG. 10B, the first frame 321 includes a permanent magnet fixing jig hole 321f, an inner opening IO, an outer opening OO, an outer end of the rotor core segment 323c, and a permanent magnet 324.

Figure 11:
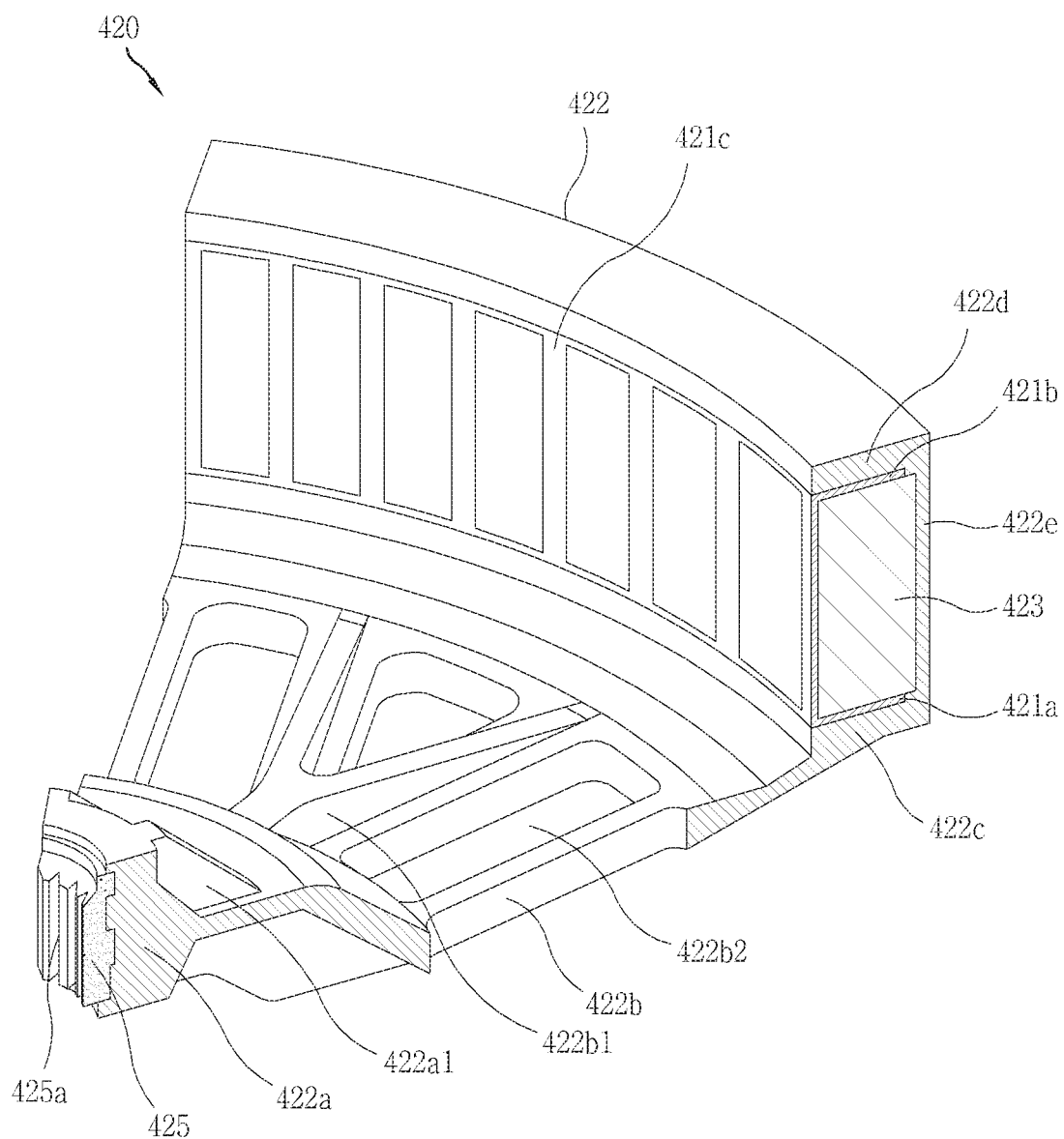
FIG. 11 is a conceptual view showing an example rotor.

FIG. 11 is a conceptual view of a rotor 420 corresponding to a fourth implementation.

The second frame 422 includes an outer wall 422e. The intermediate pillars of the first frame 421 and/or the intermediate pillars of the second frame 422 are optional configurations. The optional configuration may have an opposite meaning to a mandatory configuration, and thus denote that there may be or may not be intermediate pillars. If the mold pins corresponding to the rotor core holes 123d of the respective rotor core segments 423 are provided in the primary mold and the secondary mold, then the rotor core holes 123d of the respective rotor core segments 423 remain in an empty state subsequent to the secondary insert injection molding.

If an intermediate pillar is formed in at least one of the first frame 421 and the second frame 422, the rotor 420 of the fourth implementation has the same configuration as any one of the rotors of the first to third implementations.

In FIG. 11, the rotor 420 a first end cover 421a, a second end cover 421b, an inner pillar 421c, a bushing coupling portion 422a, a first reinforcing rib 422a1, a spoke 422b, a second reinforcing rib 422b1, a heat dissipation hole 422b2, a first end base 422c, a second end base 422d, a bushing 425, and a thread 425a.

Figure 12:
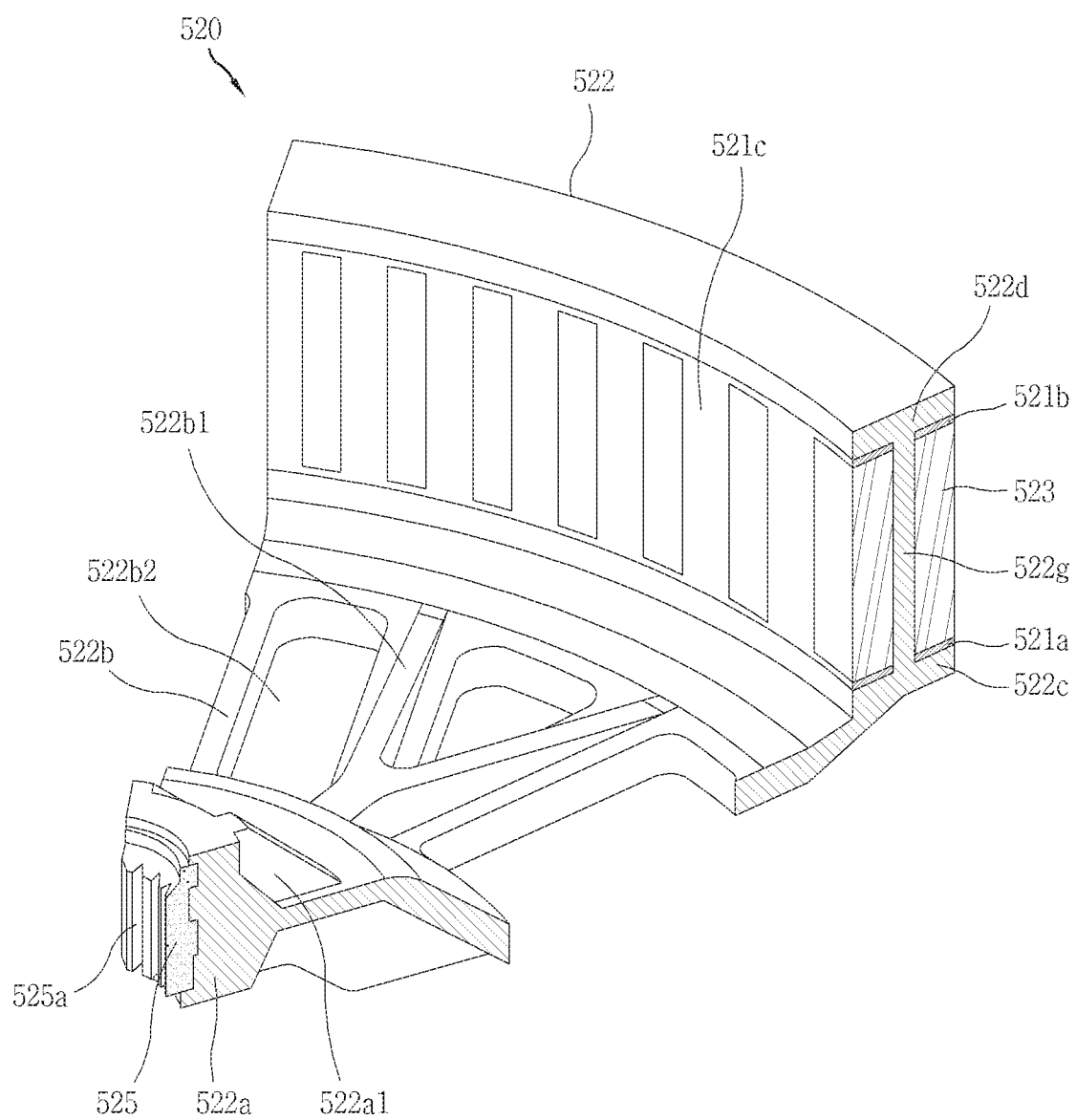
FIG. 12 is a conceptual view showing an example rotor.

FIG. 12 is a conceptual view of a rotor 520 corresponding to a fifth implementation.

A second frame 522 includes an intermediate pillar 522g, but does not include an outer wall. Accordingly, a plurality of rotor core segments 523 are exposed on both inner and outer sides in a radial direction of the second frame 522.

The intermediate pillar 522g may be provided not only in the second frame 522 but also in the first frame. Furthermore, the intermediate pillar 522g may be provided in both the first frame and the second frame 522. In this case, the intermediate pillar of the first frame and the intermediate pillar 522g of the second frame 522 may be alternately formed one by one along a circumferential direction of the rotor 520.

Referring to FIG. 12, the rotor 520 includes a first end cover 521a, a second end cover 521b, an inner pillar 521c, a bushing coupling portion 522a, a first reinforcing rib 522a1, a spoke 522b, a second reinforcing rib 522b1, a heat dissipation hole 522b2, a first end base 522c, a second end base 522d, a bushing 525, and a thread 525a.

Figure 13:
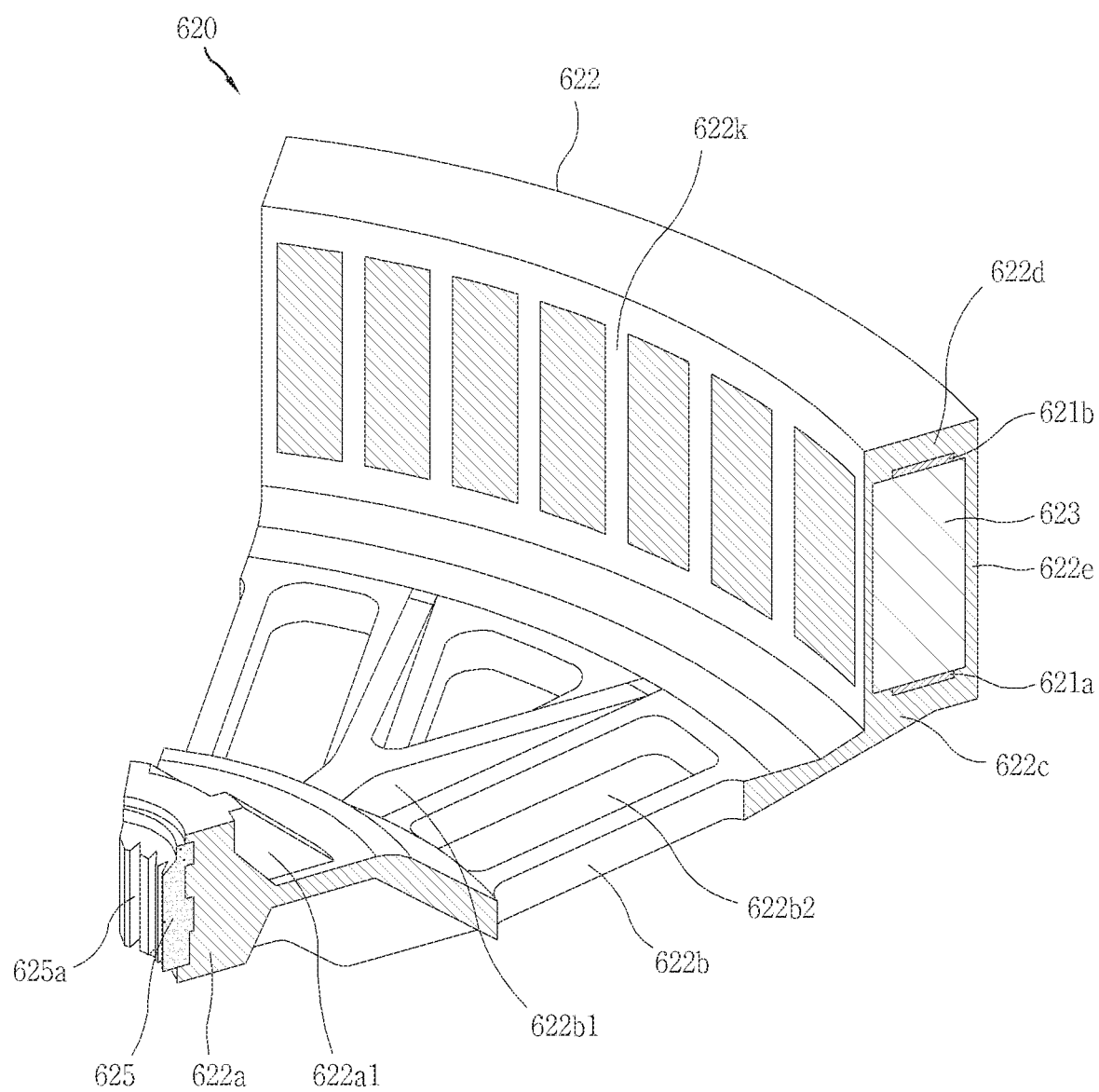
FIG. 13 is a conceptual view showing an example rotor corresponding to a sixth implementation.

FIG. 13 is a conceptual view of a rotor 620 corresponding to a sixth implementation.

The second frame 622 includes an inner wall 622k as well as an outer wall 622e. The inner wall 622k is formed to surround an inner pillar of the first frame in a radial direction of the rotor 620. The inner wall 622k may extend in a direction parallel to an axial direction of the rotation shaft so as to connect the first end base 622c and the second end base 622d to each other.

The inner wall 622k may have a plurality of openings formed along a circumferential direction, and an inner end 623d of each rotor core segments 623 may be exposed through the openings.

When the inner wall 622k is provided in the second frame 622, an inner pillar, an outer pillar and an intermediate pillar of the first frame 621 may be an alternative configuration. For instance, the first frame 621 may include only one of the inner pillar, the outer pillar, and the intermediate pillar. This is because the first end cover 621a and the second end cover 621b of the first frame 621 may be connected to each other. However, the first frame 621 does not necessarily have to alternatively include the inner pillar, the outer pillar, and the intermediate pillar, but may include all the three pillars.

Referring to FIG. 13, the rotor 620 includes the second frame 622, a first end cover 621a, a second end cover 621b, a bushing coupling portion 622a, a first reinforcing rib 622a1, a spoke 622b, a second reinforcing rib 622b1, a heat dissipation hole 622b2, a first end base 622c, a second end base 622d, an inner end of the rotor core segment 623, a bushing 625, and a thread 625a.

The configurations and methods according to the above-described implementations will not be limited to the foregoing motor, and all or part of each implementation may be selectively combined and configured to make various modifications thereto.

In some implementations, the first frame and the second frame formed with different types of materials may be provided without depending on a plurality of fastening members, thereby improving the structural strength of the rotor without causing performance degradation or size increase in the motor.

In some implementations, the first frame and the second frame may be formed of different types of resin, thereby using the advantages of each resin in combination. For instance, the first frame may be formed of a material having a tensile strength greater than that of the material of the second frame, and thus the first frame may securely fix the plurality of rotor core segments and the plurality of permanent magnets. In addition, the second frame may be made of a material having a molding contraction ratio smaller than that of the material of the first frame, which may mitigate dimensional imbalance due to shrinkage during secondary injection molding. In some examples, the first frame may be made of a material having a heat deflection temperature higher than that of the material of the second frame, thereby suppressing the occurrence of heat deflection of the first frame during the secondary insert injection molding.

In some implementations, a complete separation structure in which the respective rotor core segments are completely separated from each other, and the respective permanent magnets are completely separated from each other may be implemented, thereby maximizing the performance of the motor.

Furthermore, according to the present disclosure, the plurality of rotor core segments, the plurality of permanent magnets and the first frame are already integrated by the primary insert injection molding to form the primary injection product, thereby simplifying the secondary insert injection molding. Specifically, the number of insert parts injected into the secondary mold may be reduced during the secondary insert injection molding. In addition, the number of fixing jigs for supporting the primary injection product in the secondary mold may be reduced, and the shape of the fixing jigs may be also simplified. Various holes remaining in the primary injection product during the primary insert injection molding may be filled by a secondary injection material during the secondary insert injection molding, and therefore, the number of holes causing the deterioration of the structural strength of the rotor may be reduced on an outer surface of the rotor formed by the secondary insert injection molding.

What is claimed is:

1. A motor comprising:
a stator; and
a rotor rotatably disposed at an outer side of the stator, wherein the rotor comprises:

a plurality of rotor core segments arranged along a circumferential direction of the rotor on the outer side of the stator and spaced apart from one another to define a plurality of permanent magnet arrangement slots between the plurality of rotor core segments, a plurality of permanent magnets inserted into the plurality of permanent magnet arrangement slots, respectively, wherein the plurality of rotor core segments and the plurality of permanent magnets are alternately arranged along the circumferential direction of the rotor, a first frame that couples the plurality of rotor core segments to the plurality of permanent magnets, the first frame being made of a first material, a second frame that surrounds the plurality of rotor core segments, the plurality of permanent magnets, and the first frame and that couples the plurality of rotor core segments, the plurality of permanent magnets, and the first frame to one another, the second frame being made of a second material different from the first material, and a rotation shaft that is connected to the rotor and that passes through the stator, wherein each of the plurality of rotor core segments has a first end and a second end positioned opposite to each other in an axial direction of the rotation shaft, wherein each of the plurality of permanent magnets has a first end and a second end positioned opposite to each other in the axial direction of the rotation shaft, wherein the first frame comprises:

a first end cover that has an annular shape and that covers the first ends of the plurality of rotor core segments and the first ends of the plurality of permanent magnets, a second end cover that faces the first end cover in the axial direction, that has an annular shape, and that covers the second ends of the plurality of rotor core segments and the second ends of the plurality of permanent magnets, a plurality of inner pillars that extend in the axial direction and that connect an inner end of the first end cover and an inner end of the second end cover to each other, the plurality of inner pillars being spaced apart from one another along a circumferential direction of the first frame, and a plurality of outer pillars that extend in the axial direction and that connect an outer end of the first end cover and an outer end of the second end cover to each other, the plurality of outer pillars being spaced apart from one another along the circumferential direction of the first frame, wherein the first frame defines a plurality of first frame holes that face each other in the axial direction of the rotation shaft and that are disposed at each of the first end cover and the second end cover, wherein the plurality of first frame holes are spaced apart from one another and arranged along the circumferential direction of the first frame, wherein each of the plurality of rotor core segments comprises a body that faces a working surface of one of the plurality of permanent magnets in the circumferential direction of the rotor, the body defining a rotor core hole that extends along the axial direction of the rotation shaft, wherein the rotor core hole faces one of the plurality of first frame holes in the axial direction of the rotation shaft, and wherein the second frame comprises:

a first end base that has an annular shape along the circumferential direction of the rotor and that covers the first end cover, a second end base that has an annular shape along the circumferential direction of the rotor and that covers the second end cover, the second end base facing the first end base in the axial direction of the rotation shaft, and a plurality of intermediate pillars that extend along the axial direction of the rotation shaft and that are spaced apart from each other along a circumferential direction of the second frame, each of the plurality of intermediate pillars of the second frame connecting the first end base and the second end base to each other through the rotor core hole and one of the plurality of first frame holes.

2. The motor of claim 1, wherein a tensile strength of the first material is greater than a tensile strength of the second material.

3. The motor of claim 1, wherein a contraction ratio of the second material in molding the second frame is less than a contraction ratio of the first material in molding the first frame.

4. The motor of claim 1, wherein a thermal deflection temperature of the first material is less than a thermal deflection temperature of the second material.

5. The motor of claim 1, wherein the plurality of inner pillars and the plurality of outer pillars are alternately arranged along the circumferential direction of the first frame.

6. The motor of claim 1, wherein two adjacent inner pillars of the plurality of inner pillars define an opening between the inner end of the first end cover and the inner end of the second end cover, and wherein an inner end of one of the plurality of rotor core segments is exposed in a radial direction of the rotor through the opening.

7. The motor of claim 1, wherein the plurality of rotor core segments and the plurality of inner pillars are alternately arranged along the circumferential direction of the first frame, and wherein the plurality of rotor core segments and the plurality of inner pillars cover the plurality of permanent magnets in a radial direction of the first frame.

8. The motor of claim 1, wherein each of the plurality of rotor core segments further comprises core protrusions that protrude radially outward from an outer end of the body and that are spaced apart from each other in the circumferential direction of the rotor to thereby define a rotor core slot between the core protrusions, and wherein each of the plurality of outer pillars is inserted into the rotor core slot.

9. The motor of claim 1, wherein the first frame defines a permanent magnet fixing jig hole at a boundary between the first end cover and each of the plurality of inner pillars.

10. The motor of claim 9, wherein the second frame further comprises:

a plurality of protrusions that protrude in the axial direction of the rotation shaft from an inner end of the first end base and that are spaced apart from one another along the inner end of the first end base, each of the plurality of protrusions being inserted into the permanent magnet fixing jig hole.

11. The motor of claim 1, wherein the second frame further comprises:

an outer wall that surrounds an outer end of the first frame in a radial direction of the rotor, that extends along the axial direction of the rotation shaft, and that connects the first end base and the second end base to each other.

12. The motor of claim 11, wherein the second frame further comprises an inner wall that surrounds an inner end of the first frame in the radial direction of the rotor, that extends along the axial direction of the rotation shaft, and that connects the first end base and the second end base to each other.

13. The motor of claim 12, wherein the inner wall defines a plurality of openings that are arranged along the circumferential direction of the rotor, and
wherein each of the plurality of openings exposes an inner end of one of the plurality of rotor core segments in the radial direction of the rotor.

14. A motor comprising:
a stator; and
a rotor rotatably disposed at an outer side of the stator, wherein the rotor comprises:
a plurality of rotor core segments arranged along a circumferential direction of the rotor on the outer side of the stator and spaced apart from one another to define a plurality of permanent magnet arrangement slots between the plurality of rotor core segments,
a plurality of permanent magnets inserted into the plurality of permanent magnet arrangement slots, respectively, wherein the plurality of rotor core segments and the plurality of permanent magnets are alternately arranged along the circumferential direction of the rotor,
a first frame that couples the plurality of rotor core segments to the plurality of permanent magnets, the first frame being made of a first material,
a second frame that surrounds the plurality of rotor core segments, the plurality of permanent magnets, and the first frame and that couples the plurality of rotor core segments, the plurality of permanent magnets, and the first frame to one another, the second frame being made of a second material different from the first material, and
a rotation shaft that is connected to the rotor and that passes through the stator,
wherein each of the plurality of rotor core segments has a first end and a second end positioned opposite to each other in an axial direction of the rotation shaft,
wherein each of the plurality of permanent magnets has a first end and a second end positioned opposite to each other in the axial direction of the rotation shaft,
wherein the first frame comprises:
a first end cover that has an annular shape and that covers the first ends of the plurality of rotor core segments and the first ends of the plurality of permanent magnets,
a second end cover that faces the first end cover in the axial direction, that has an annular shape, and that covers the second ends of the plurality of rotor core segments and the second ends of the plurality of permanent magnets,
a plurality of inner pillars that extend in the axial direction and that connect an inner end of the first end cover and an inner end of the second end cover to each other, the plurality of inner pillars being spaced apart from one another along a circumferential direction of the first frame, and
a plurality of outer pillars that extend in the axial direction and that connect an outer end of the first end cover and an outer end of the second end cover to each other, the plurality of outer pillars being spaced apart from one another along the circumferential direction of the first frame,
wherein the first frame defines a plurality of first frame holes that face each other in the axial direction of the rotation shaft and that are disposed at each of the first end cover and the second end cover,
wherein the plurality of first frame holes are spaced apart from one another and arranged along the circumferential direction of the first frame,
wherein each of the plurality of rotor core segments comprises a body that faces a working surface of one of the plurality of permanent magnets in the circumferential direction of the rotor, the body defining a rotor core hole that extends along the axial direction of the rotation shaft,
wherein each of the plurality of first frame holes faces one of the rotor core holes in the axial direction of the rotation shaft,
wherein each of the plurality of first frame holes is defined between two rotor core holes of the plurality of rotor core segments in the circumferential direction of the first frame,
wherein the first frame comprises a plurality of first intermediate pillars that are each disposed between the plurality of inner pillars and the plurality of outer pillars in a radial direction of the first frame,
wherein each of the plurality of first intermediate pillar extends in the axial direction of the rotation shaft and connects the first end cover and the second end cover to each other through one of the rotor core holes,
wherein the second frame comprises:
a first end base that has an annular shape along the circumferential direction of the rotor and that covers the first end cover,
a second end base that has an annular shape along the circumferential direction of the rotor and that covers the second end cover, the second end base facing the second end cover in the axial direction, and
a plurality of second intermediate pillars, each of the plurality of second intermediate pillars extending along the axial direction of the rotation shaft and connecting the first end base and the second end base to each other through one of the rotor core holes and one of the first frame holes, and
wherein the plurality of first intermediate pillars and the plurality of second intermediate pillars are alternately arranged along the circumferential direction of the rotor and are spaced apart from one another along the circumferential direction of the rotor.

* * * * *